United States Patent [19]

Benian

[11] Patent Number: 5,667,683
[45] Date of Patent: Sep. 16, 1997

[54] BACKWASHABLE LIQUID FILTER SYSTEM USING ROTATING SPRAY

[75] Inventor: Robert Benian, West Bloomfield, Mich.

[73] Assignee: Benian Filter Company, Inc., West Bloomfield, Mich.

[21] Appl. No.: 545,429

[22] Filed: Oct. 19, 1995

Related U.S. Application Data

[60] Continuation-in-part of Ser. No. 179,184, Jan. 10, 1994, Pat. No. 5,510,029, which is a division of Ser. No. 11,507, Jan. 29, 1993, Pat. No. 5,301,880, which is a division of Ser. No. 900,003, Jun. 17, 1992, Pat. No. 5,203,998.

[51] Int. Cl.⁶ .................................................. B01D 29/68
[52] U.S. Cl. ...................... 210/409; 210/410.1; 210/420; 210/427; 210/448
[58] Field of Search ........................... 210/405, 409, 210/416.1, 420, 427, 448, 354

[56] References Cited

U.S. PATENT DOCUMENTS

| | | |
|---|---|---|
| 765,534 | 7/1904 | Williams . |
| 1,830,098 | 11/1931 | Dollinger . |
| 2,748,944 | 6/1956 | Kalinske . |
| 3,236,249 | 2/1966 | Everroad . |
| 3,647,071 | 3/1972 | Lamort . |
| 3,679,136 | 7/1972 | Snyder . |
| 4,186,099 | 1/1980 | Henschel, Jr. et al. . |
| 4,529,516 | 7/1985 | Nolan . |
| 4,552,657 | 11/1985 | Ogawa . |
| 4,552,669 | 11/1985 | Sekellick . |
| 4,808,234 | 2/1989 | McKay et al. ................ 210/354 |
| 4,822,486 | 4/1989 | Walkins et al. ............ 210/416.1 |
| 4,954,255 | 9/1990 | Muller et al. . |
| 5,104,534 | 4/1992 | Branchcomb . |
| 5,128,034 | 7/1992 | Kool . |
| 5,472,604 | 12/1995 | Yang ............................. 210/409 |

Primary Examiner—David A. Reifsnyder
Attorney, Agent, or Firm—Harness, Dickey & Pierce, P.L.C.

[57] ABSTRACT

A liquid-cleaning filtering system has at least one permanent filter assembly that is capable of being promptly back-washed thus minimizing the down time of machinery. Each filter assembly utilizes a wire mesh filter cartridge which is backwashed by a powered internal rotating sprayer nozzle assembly that is operable to deliver a plurality of high pressure streams of liquid to a surface of the wire mesh. Each filter assembly is capable of being repeatedly used and then backwashed in order to return it to a pristine state. The rotating spray nozzle assembly may be powered by hydraulics, pneumatics or an electric motor. A plurality of filter assemblies may be arranged together in a fluid processing center in order to process large volumes of industrial waste.

19 Claims, 14 Drawing Sheets

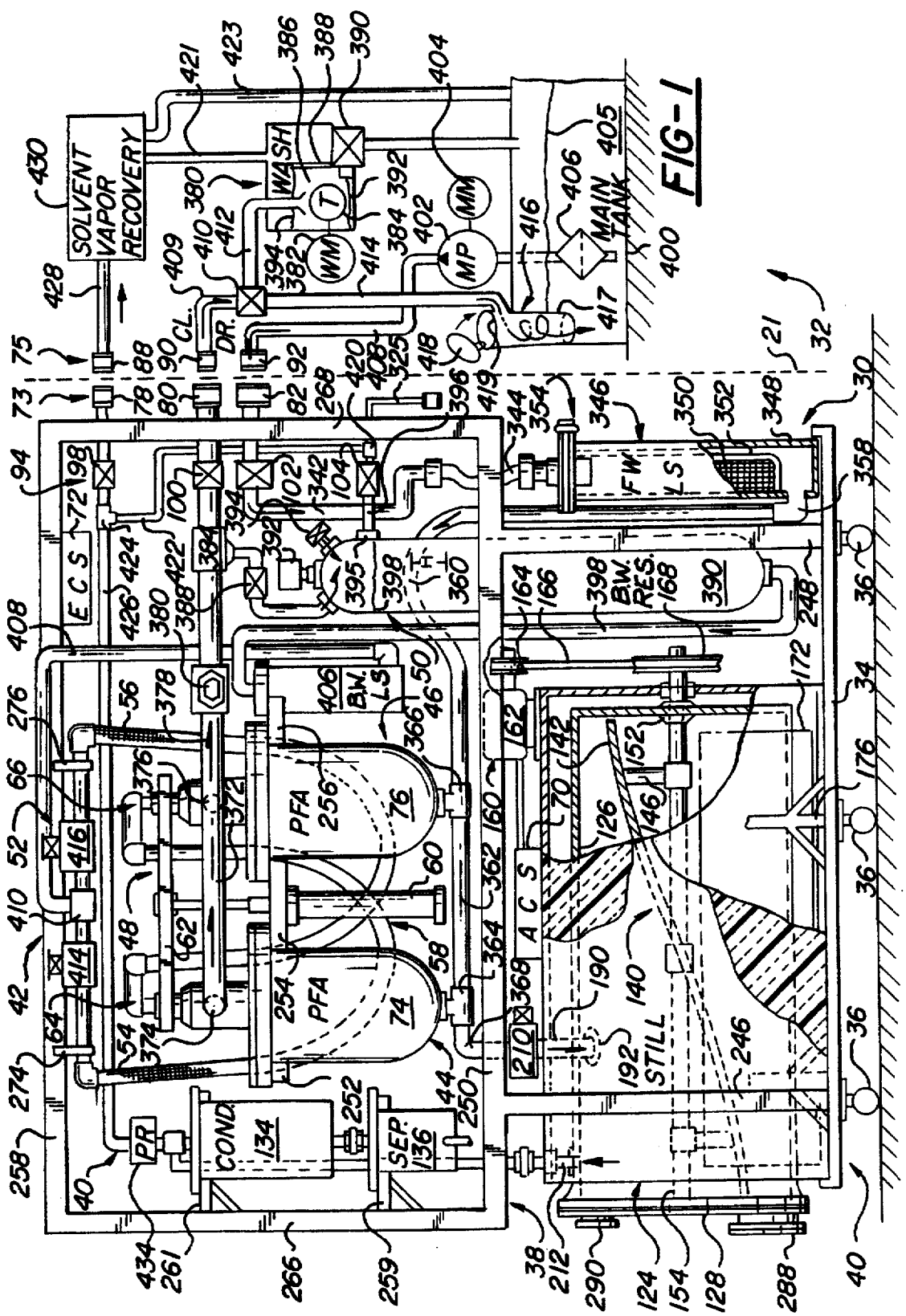

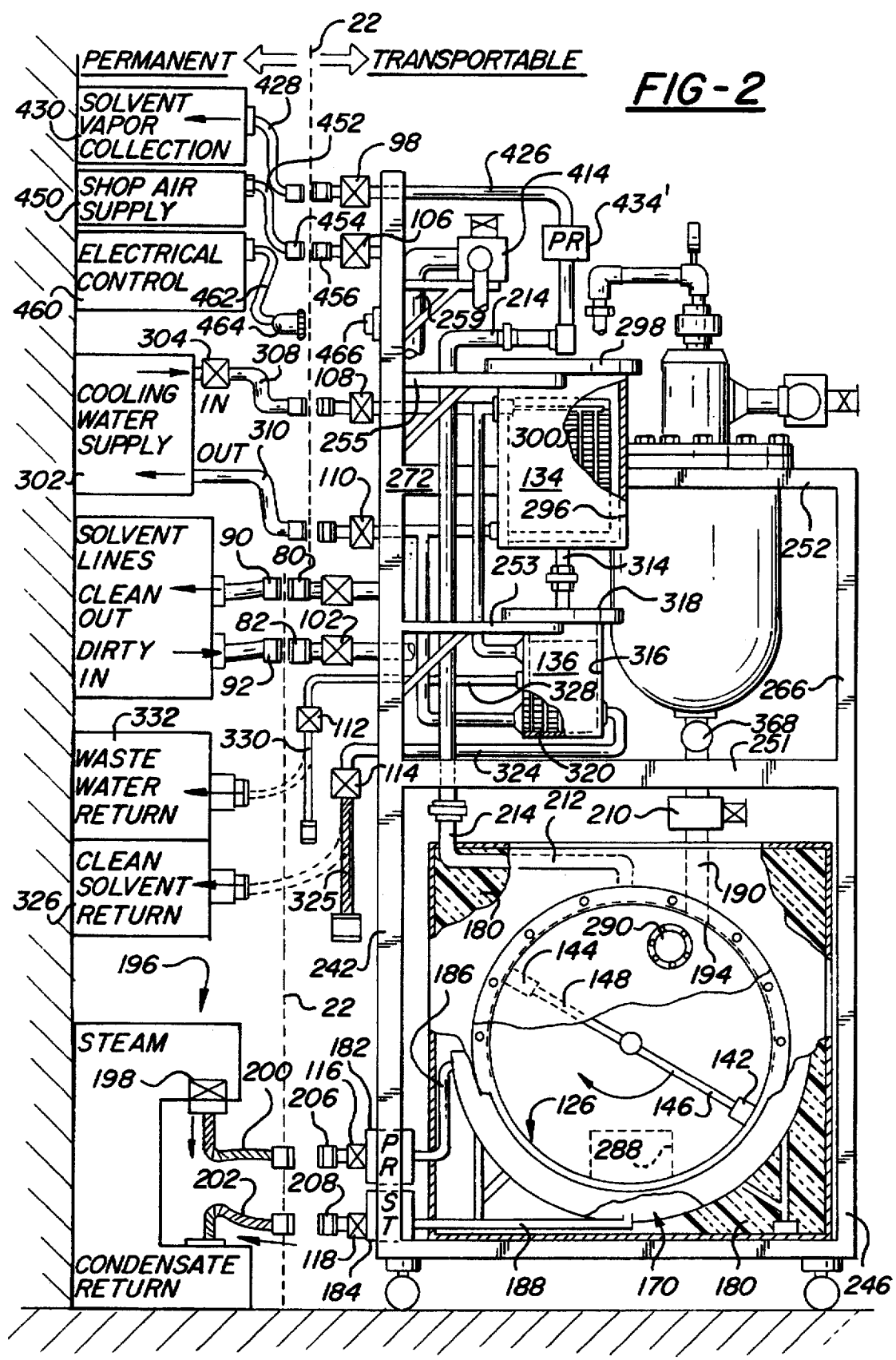

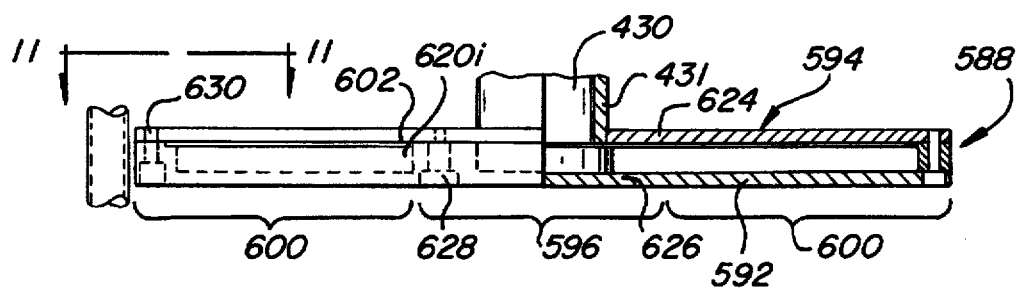
FIG-10
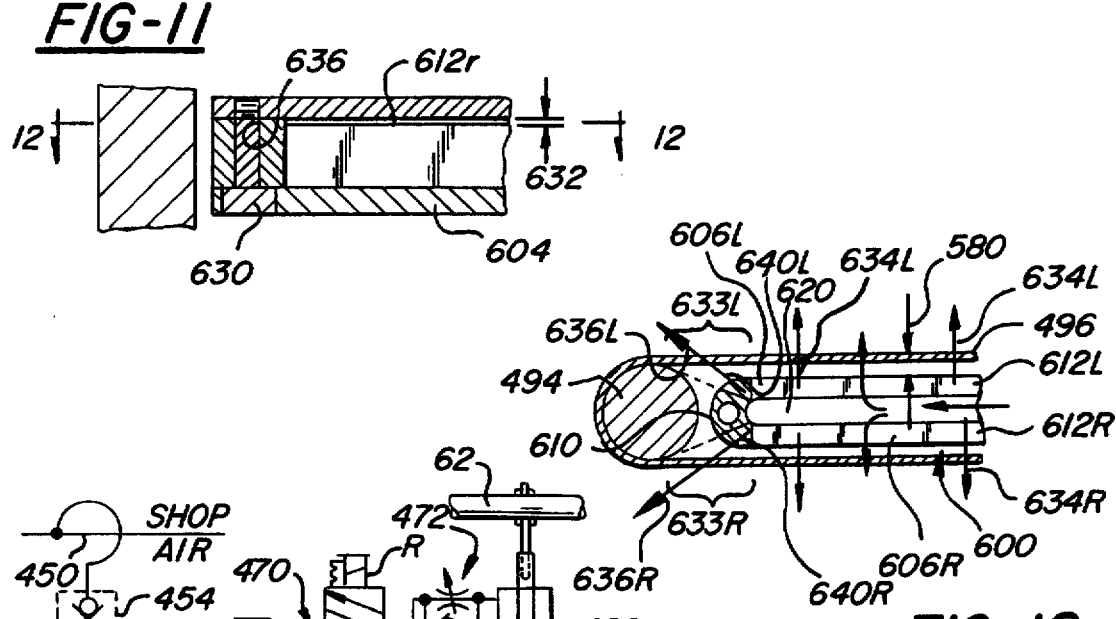
FIG-11
FIG-12
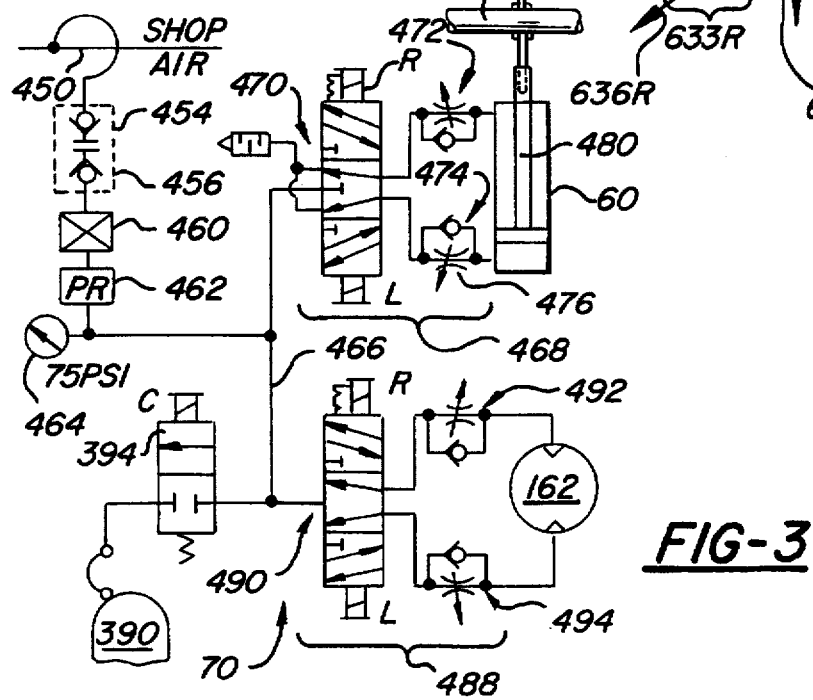
FIG-3

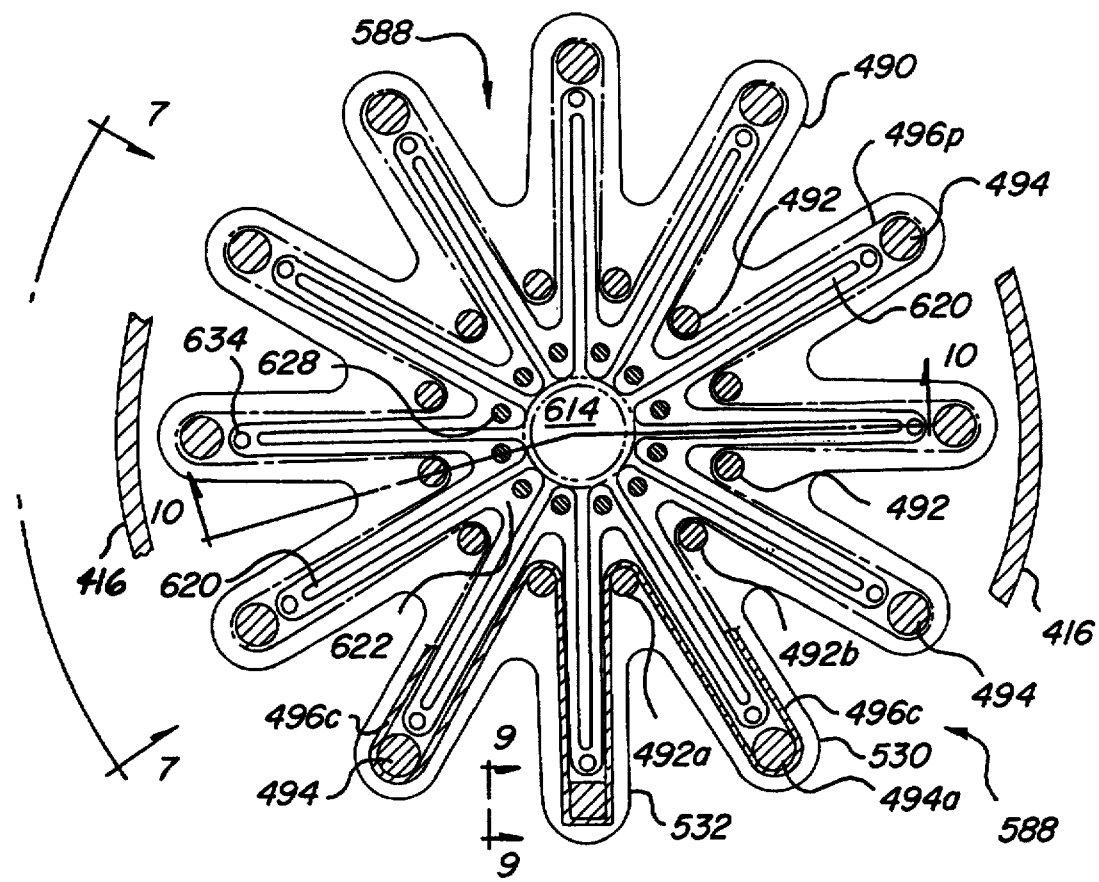
FIG-6
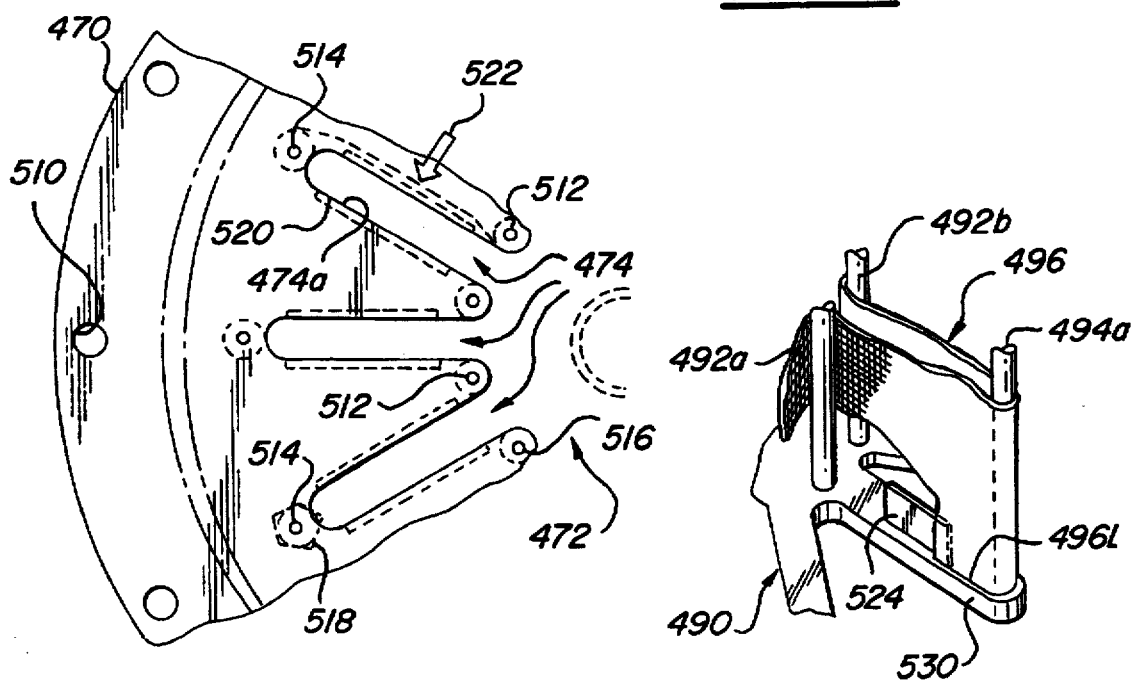
FIG-7
FIG-8

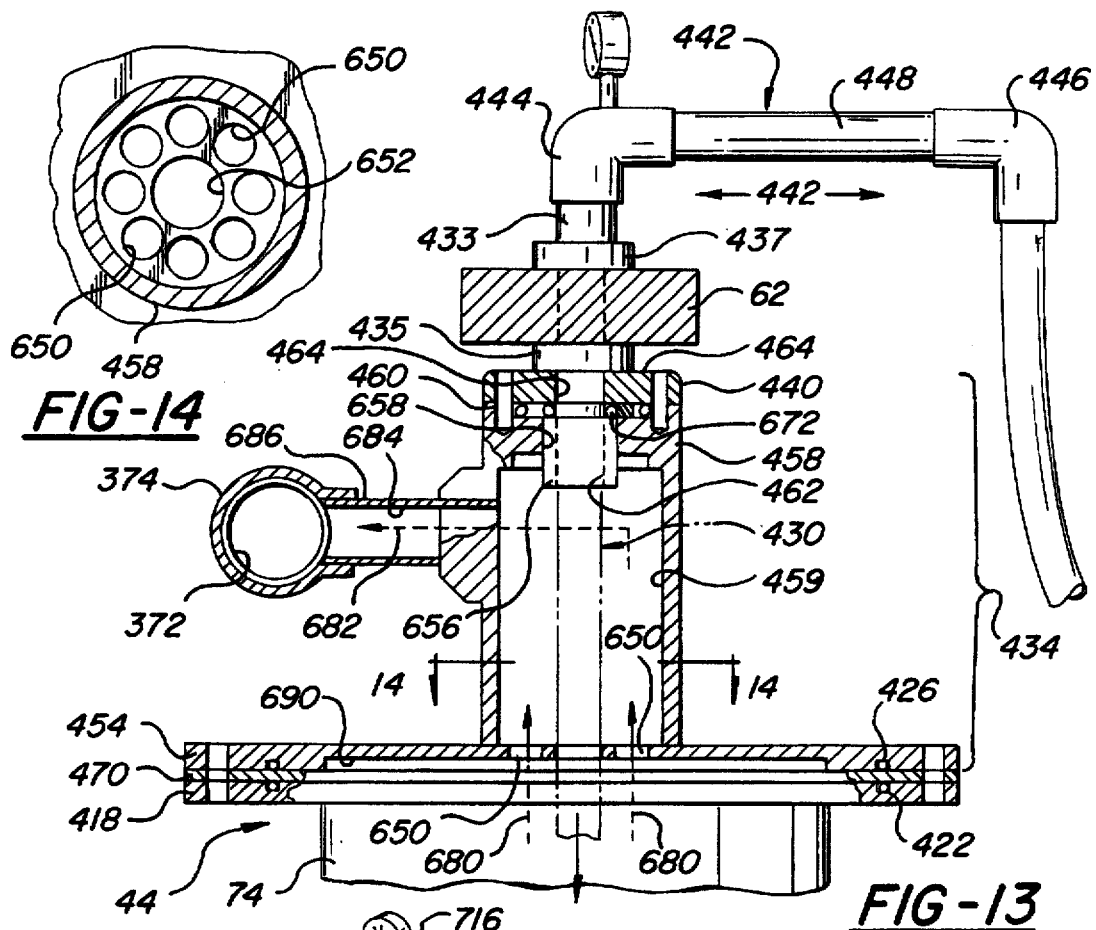
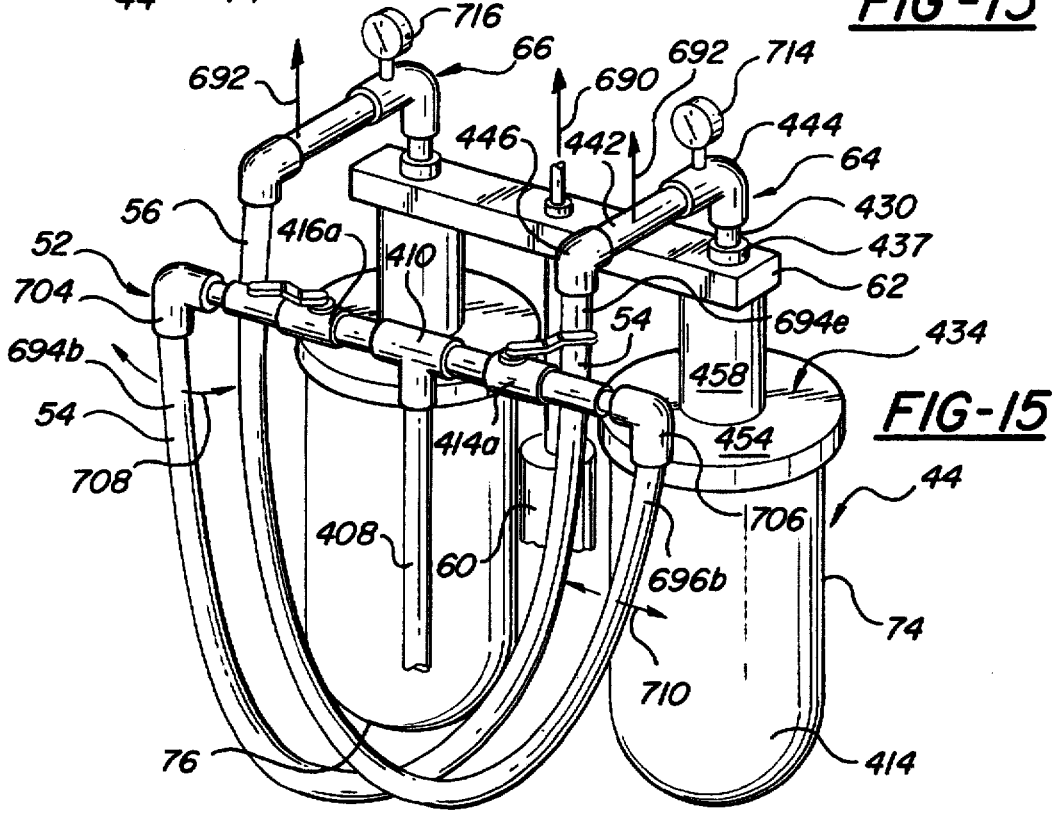

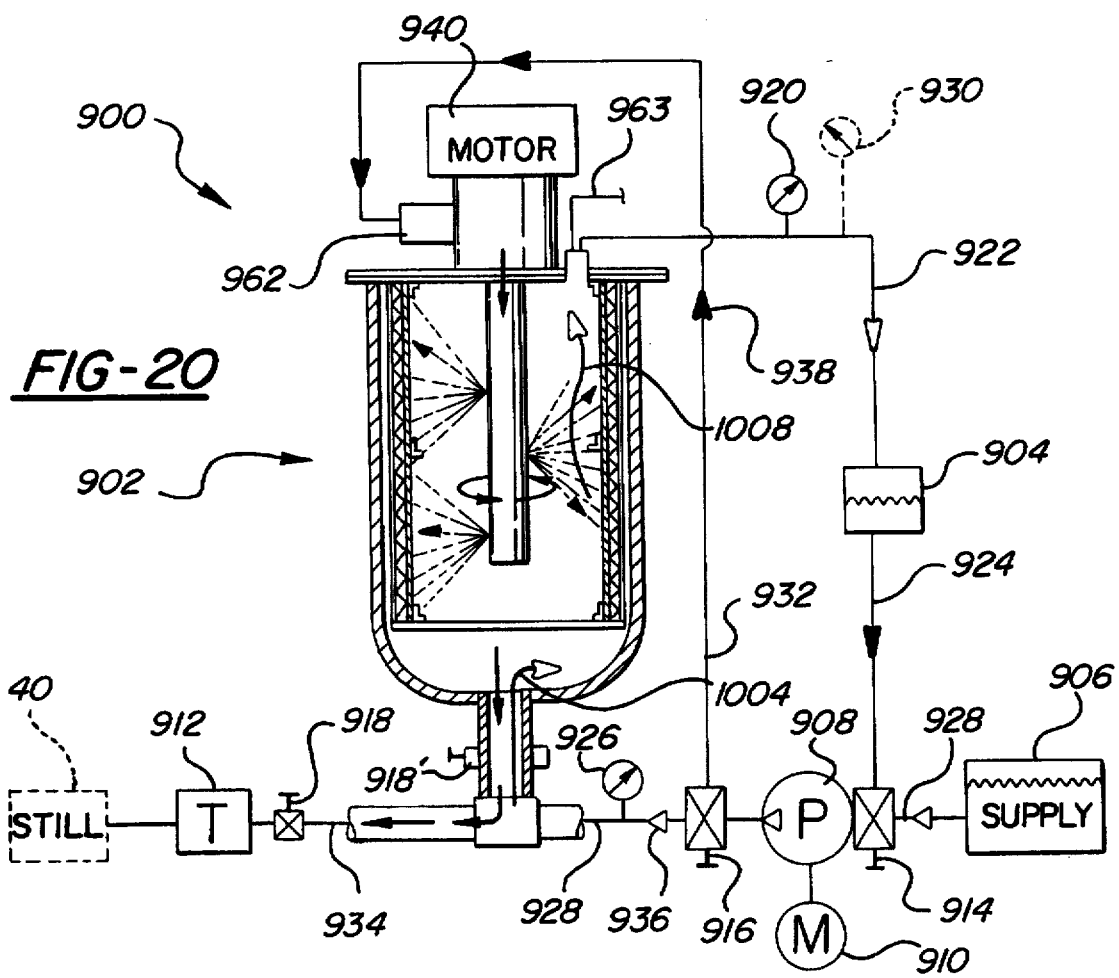
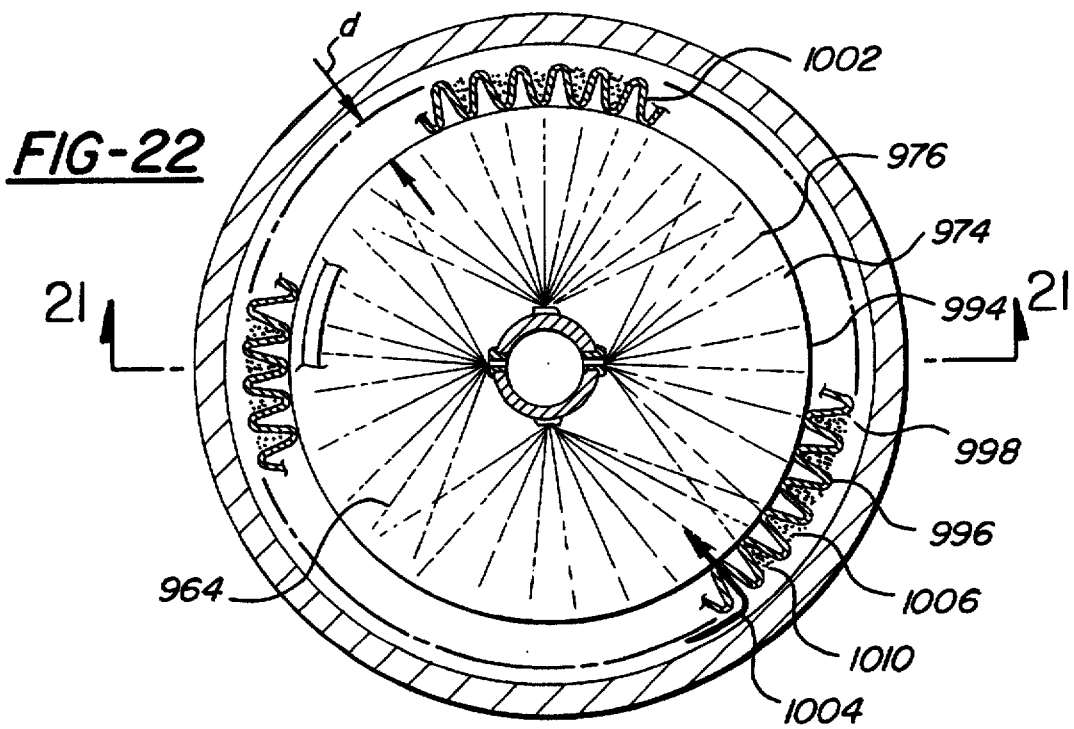

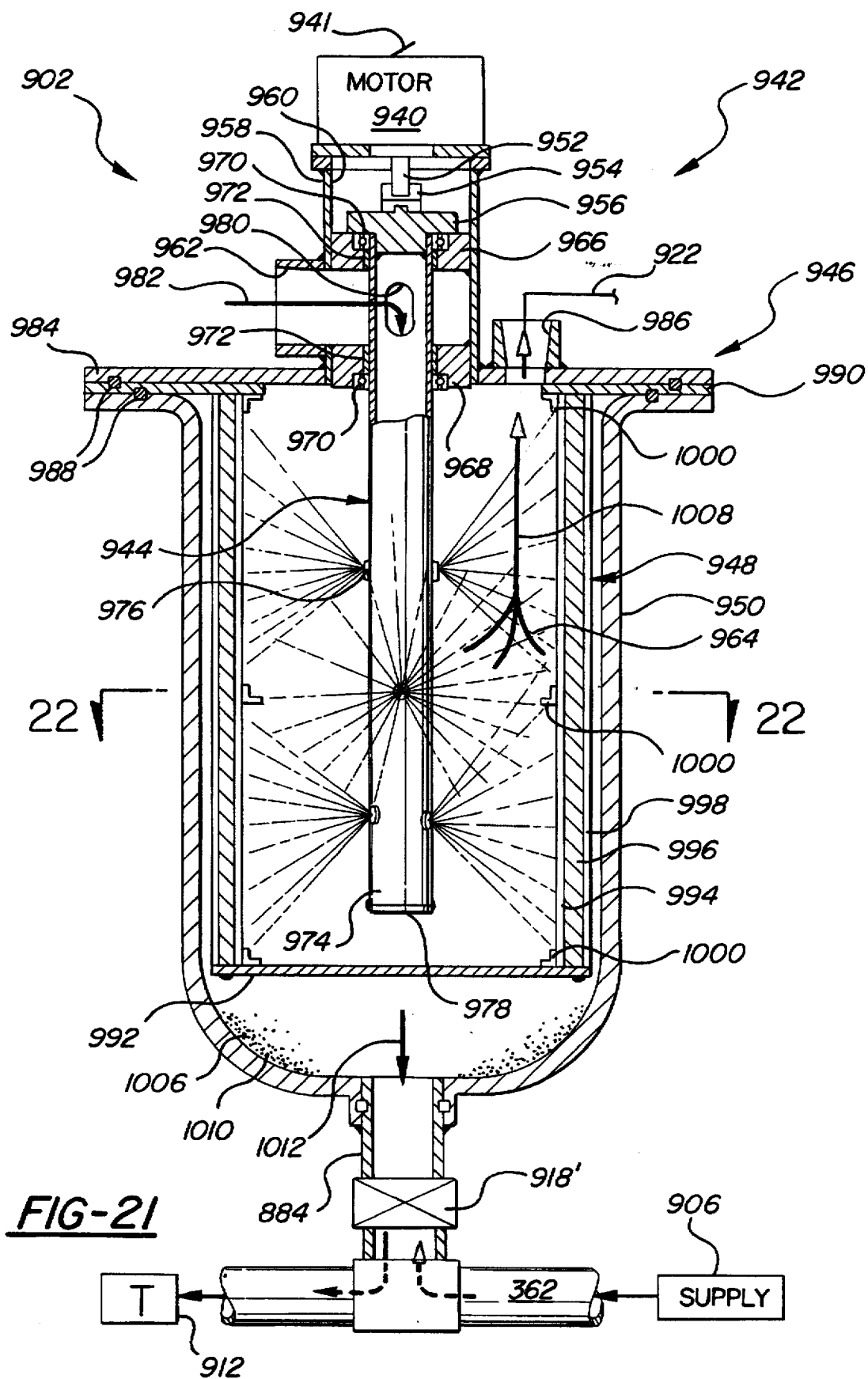

BACKWASHABLE LIQUID FILTER SYSTEM USING ROTATING SPRAY

Cross-reference To Related applications

This is a continuation-in-part of patent application Ser. No. 08/179,184 filed Jan. 10, 1994, now U.S. Pat. No. 5,510,029 which is a division of patent application Ser. No. 08/011,507 filed Jan. 29, 1993, now U.S. Pat. No. 5,301,880, which is a division of patent application Ser. No. 07/900,003 filed Jun. 17, 1992, now U.S. Pat. No. 5,203,998.

BACKGROUND OF THE INVENTION

1. Field of the Invention

The invention relates, in general, to liquid filtering systems, and in particular to permanent filter systems for liquids that utilize one or more permanent filter cartridges that can be backwashed through the use of rotating high pressure sprayer assemblies, and to the ancillary equipment used with such cartridges and sprayer assemblies.

2. Description of the Related Art

Filtration systems for cleaning contaminated liquid have long been used in commercial and industrial operations where liquids, such as solvents, need to be continuously cleansed during a particular process, such as dry cleaning clothes at a professional dry cleaner. During normal operating conditions, the liquid to be filtered generally passes through a filter cartridge that is made of either disposable paper or wire mesh for collecting the contaminants, generally solids, that are suspended within the liquid. Typically, only by maintaining the level of suspended solids and other contaminants within the liquid below a certain level, can the machinery that utilizes the liquid operate properly or for its expected number of cycles. After a number of hours or cycles of running a given industrial or commercial process, the filters must be changed in order to keep the percentage of soluble soil within the liquid at a desired low level. For example, in dry cleaning operations in order to properly cleanse the clothes, it is very important to maintain a certain minimum level of purity of the dry cleaning solution in order to achieve the desired cleaning level and also to remove odors from the clothes.

Dry cleaning operations typically use Perchloroethylene combined with a small amount of surfactants and water as the liquid solvent to cleanse a variety of different types of clothing articles during a typical dry cleaning process. In conventional dry cleaning systems, the solvent is cleansed by a filter bed including a layer of paper or wire mesh material, covered with a very thin layer of diatomaceous earth which, in turn, is covered with a very thin layer of even finer activated carbon particles. This filter bed removes contaminates, which are primarily colloidally suspended solids that are washed from the clothes, and also removes various acids and odors that are dissolved in the solvent. In known filter systems, a filter assembly using replaceable cartridge filters that must be manually installed and removed from the filter assembly are utilized. The problem with servicing this type of filters are several. First, the dry cleaning system must be shut down during this filter-changing period for a fair amount of time, thus increasing downtime and decreasing overall productivity of the dry cleaning operation. Second, the disposable filters and the particulate resulting from a conventional distillation process are considered hazardous, since Perchloroethylene is listed by federal environmental regulations as a toxic substance, even at relatively low concentration levels. Accordingly, they, too, must be disposed of in a manner consistent with hazardous waste regulations. Manually changing filters not only increases exposure to these solvents, but also is messy due to the remnants of the used powdery filter bed materials which remain caked on the filters, including the very fine activated carbon powder. Thus, the necessary step of changing the disposable filter cartridge is quite unpleasant. Yet, if the operator of the dry cleaning system elects to run the dry cleaning washer when the solvent is contaminated to an unacceptable level, the clothes will not be properly cleaned. Thus, the dry cleaning operators must follow a schedule and change the filters on a regular basis, even though it is very unpleasant to do, in order to maintain quality in a dry cleaning operation.

It would be preferable to have a liquid filter cleaning system that would minimize the down time of the dry cleaning process by reducing the time required to service the filter cartridges. It would also be preferred to have a liquid filter cleaning system with a reusable filter that could be easily and repeatedly reconditioned to its original pristine state of cleanliness. In other words, it would be very desirable to be able to successfully remove all contaminants, diatomaceous earth and activated carbon from a permanent filter before beginning the next normal dry cleaning operation, which commences with the re-establishment of the filter bed, by adding fresh diatomaceous earth/activated carbon materials on a permanent filter sheet.

Some manufacturing process that employ liquids, such as solution, and the like, utilize complicated liquid-cleaning systems that not only filter out the contaminants picked up by the liquid in the process, but also distill the sludge that is created when the system's filters are backwashed. The distillation systems are generally large in size and have different types of vessels for handling the liquids or vapors. These vessels are elaborately interconnected by piping and permanently anchored to the floor or mounted to a support structure or trusses of the building. For example, in professional dry cleaning establishments, the liquid-cleaning system includes the filtering equipment, and also distillation equipment which normally includes a still (that is the reservoir in which the solvent is heated), a heating system, storage tanks, separators, condensers, various shut-off valves, motor-driven pumps and large contaminant traps, such as lint strainers. When the liquid system is down for the failure of or complex servicing of any one of these components, the entire dry cleaning operation must cease until the entire liquid-cleaning system is back to a fully operational condition. A lengthy downtime of the solvent cleaning system in a dry cleaning establishment wrecks havoc on business since all operations at the particular establishment are suspended. In order to meet commitments to customers, the clothes must be dry cleaned elsewhere and returned. Applicant hereby incorporates by reference its related U.S. Pat. No. 5,203,998.

It would, thus, be desirable to have a liquid-cleaning system that can be easily transported as a unit, and is ruggedly constructed to withstand the inevitable vibrations that occur when bulky equipment is shipped by truck. Further, it would be highly desirable to make it possible to rapidly decouple and recouple the unit to the commercial or manufacturing operation it is used with. In this way, when one or more components of the liquid-cleaning system needed service that could not be rapidly performed on-site, it would be possible to have an identical secondary liquid-cleaning system available that could be quickly interchanged with the primary liquid-cleaning system, which would then be serviced at the factory. This arrangement would permit the down time of the dry cleaning operation to be minimized when factory service or reconditioning of any portion of the liquid-cleaning system is required.

In light of the foregoing needs, one object of the present invention is to provide a liquid-cleaning system that employs a filter assembly having a permanent filter cartridge which can be reconditioned through backflushing to an original pristine state. An object of the invention is to provide a large surface area to unit volume ratio for such a permanent filter cartridge.

A related object of the present invention is to provide a rotatable sprayer nozzle assembly that fits within a permanent mesh filter cartridge and provides a plurality of high velocity jets of fluid for efficiently backflushing the mesh filter.

A further object of the present invention is to provide an arrangement for enhancing the capacity of a permanent filter system for liquids to be cleaned by using a plurality of permanent filter assemblies in parallel.

Another related object of the present invention is to provide common backwash, supply and return manifolds for processing large volumes of fluid.

Another primary object of the present invention is to provide a compact, transportable liquid-cleaning system including one or more permanent filter assemblies and a distillation system for processing spent solvent produced by backflushing dry cleaning filter beds which include diatomaceous earth and activated carbon powder.

Yet another object of an alternative form of the present invention is to provide a fluid processing center that is operable to process large volumes of contaminated solvent or other fluid by using a plurality of permanent filter assemblies that are connected in parallel to common manifolds. Such a fluid processing center can be designed to accommodate an infinite number of permanent filter assemblies each of which having a capacity to process a predetermined amount of solvent.

A related object of the alternative form of the present invention is to provide an improved fluid processing center that employs its own independent backwashable fluid circuit that is distinct from the fluid filtering circuit. Another object of this invention is to provide the operator with the capability of continuously running the filtering mode of operation while selectively backwashing a permanent filter assembly that needs to be cleaned. Such system offers tremendous economic advantages.

And finally, an object of an additional alternative form of the present invention is to provide a fluid processing center employing a plurality of filter assemblies that are connected to manifolds for processing large volumes of contaminated reusable solvent. Such a processing center should allow the operator to selectively backwash certain filter assemblies while continuously running the normal filtering mode of operation.

These and other objects, features and advantages of the present invention will become clear upon reading the following summary and detailed description of the backwashable permanent liquid filter system using rotating spray member and methods of the present invention.

SUMMARY OF THE INVENTION

A key to successful use of permanent filters is the ability to repeatedly clean them to their original pristine state. This object is met, according to first aspect of the present invention, by a nozzle structure for producing multiple thin streams of liquid for backwashing a permanent filter.

Further, there is provided a backwashable filter assembly having a permanent filter mesh material disposed about support members in a corrugated configuration, to increase the filter surface area to unit volume ratio. The permanent filter apparatus includes a filter cartridge assembly, a nozzle assembly, a motor for rotating the nozzle assembly, a head section and a housing.

Another aspect of the present invention relates to an alternative embodiment that utilizes a pressurizable filter assembly. This improved filter assembly includes a fluid pump and an axially extending fluid delivery nozzle assembly. One end of the nozzle assembly is fixed to the pump and the other end of the nozzle assembly extends into a filter housing. The nozzle assembly includes an elongated nozzle shaft that has a plurality of spray nozzles strategically placed around the periphery of the nozzle shaft. The nozzle shaft and the fluid pump rotate simultaneously to cause a rotating backwashable filtered cleaning function. The filter housing includes a head section, a cover, and a bell-shaped housing, which together creates a hermetic shell which encapsulates an elongated permanent filter cartridge. The filter cartridge conforms with the configuration of the filter housing and is capable of being cleaned to a pristine condition by the high pressurized streams of fluid that are generated by the rotating spray assembly.

While the permanent filter assembly just described is useful, having a plurality of such permanent filter assemblies in a single filtering system is desirable to enhance the capacity of the filter system. To achieve this result, a novel manifold system was developed for use within a fluid processing center that is capable of handling massive volumes of contaminated fluid that needs to be recycled. The fluid processing center is comprised of a plurality of permanent filter assemblies arranged in parallel to a supply manifold, a backwash manifold and a return manifold. A fluid pump delivers a steady supply of fluid to the permanent filter assemblies.

Another aspect of the present invention includes a fluid processing center that employs its own separate backwashable fluid circuit that is distinct from the normal fluid filtering circuit. According to this aspect of the invention, the unique backwashable fluid circuit employs its own pump and fluid supply source which is capable of delivering a steady supply of fluid to the rotatable nozzle assembly for cleaning the filter cartridge assembly. A distillation system is not required for this fluid processing center.

Several other important aspects of the present invention exist, including the methods for using the above-described equipment of the present invention. The aforementioned aspects, objects and advantages of the present invention will be better understood by examining the preferred embodiments of the present invention illustrated in the Figures and by studying the detailed descriptions and claims found below.

BRIEF DESCRIPTION OF THE DRAWINGS

In the drawings, where the same reference numerals indicate similar components or features in the various Figures:

FIG. 1 is a simplified front view, shown partially in block diagram form on the left side of vertical dashed line 21, of one embodiment of a transportable permanent filter liquid-cleaning system of the present invention which includes, a rectangular housing containing a still, two permanent mesh filter assemblies serviced by a single reciprocating backwash header/nozzle assembly, and other components, and, on the right side of dashed line 21, conventional dry cleaning washer equipment with which the liquid-filtering system of the present invention may be used is shown;

FIG. 2 is a simplified left side view, shown partially in block diagram form on the right side of dashed vertical line 21 of the FIG. 1, permanent filter liquid-cleaning system, showing the various connectors employed to hook up the transportable FIG. 1 system to a conventional, permanently installed solvent system which produces a liquid solvent to be filtered and distilled;

FIG. 3 is a schematic diagram showing the air control system used in a preferred embodiment of the FIG. 1 system of the present invention;

FIG. 6 is a cross-sectional view taken along line 6—6 of FIG. 5, showing the star configuration of the permanent filter cartridge and sprayer nozzle structure;

FIG. 7 is a fragmentary top view of the top plate of the filter cartridge assembly, showing a pie-shaped region of the top plate generally indicated by line 7—7 in FIG. 6;

FIG. 8 is an enlarged perspective view, partially broken away, of the construction of an area of the lower portion of the filter cartridge assembly, generally identified by line 8—8 in FIG. 4, showing how the permanent filter material, namely wire mesh, is wrapped around one outer tie rod and two adjacent inner tie rods;

FIG. 9 is a greatly enlarged fragmentary perspective view of one special outer tie rod connected to the bottom cartridge plate, as indicated generally at line 9—9 of FIG. 6, where the side edges of the wire mesh sheet material forming the permanent filter material are overlapped and tack welded to the tie rod;

FIG. 10 is a side elevational view, partially in cross-section, of a sprayer nozzle structure of the present invention, as seen from line 10—10 of FIG. 6, illustrating two long, very thin slots for producing two thin sheets of high velocity spray used to clean the permanent filter cartridge assembly during the backwashing step;

FIG. 11 is an enlarged fragmentary side cross-sectional view illustrating the outer portion of the elongated finger section of the sprayer nozzle indicated by line 11—11 of FIG. 10;

FIG. 12 is an enlarged fragmentary cross-sectional view taken along line 12—12 of FIG. 11, illustrating how the elongated sprayer slots are sculpted to ensure mesh material adjacent the outer tie rod is backwashed;

FIG. 13 is an enlarged side elevational view in partial cross-section of the filter cover subassembly, generally indicated by line 13—13 of FIG. 5, shown in position with respect to the filter housing assembly;

FIG. 14 is an enlarged cross-section view, taken along line 14—14 of FIG. 13, showing the fluid passageways which enable filtered liquid within the inside of the filter cartridge to pass through the bottom plate of the filter cover assembly;

FIG. 15 is a simplified perspective rear view of a backwash manifold structure with dual hanging hoses for supplying backwash solvent to the dual reciprocating nozzle assemblies supported on a common tie bar which is raised and lowered by a single lift mechanism;

FIG. 20 is a schematic diagram of a preferred backwashable permanent filter system that utilizes an electric motor to facilitate rotation of the nozzle assembly;

FIG. 21 is an enlarged side elevational view of the permanent filter assembly of FIG. 20, illustrating the details of the filter cartridge assembly including the motor driven nozzle assembly;

FIG. 22 is an enlarged cross-sectional view taken along line 22—22 of FIG. 21, illustrating how the nozzle, filter cartridge and filter housing are assembled;

DETAILED DESCRIPTION OF THE PREFERRED EMBODIMENTS

Figure 4:
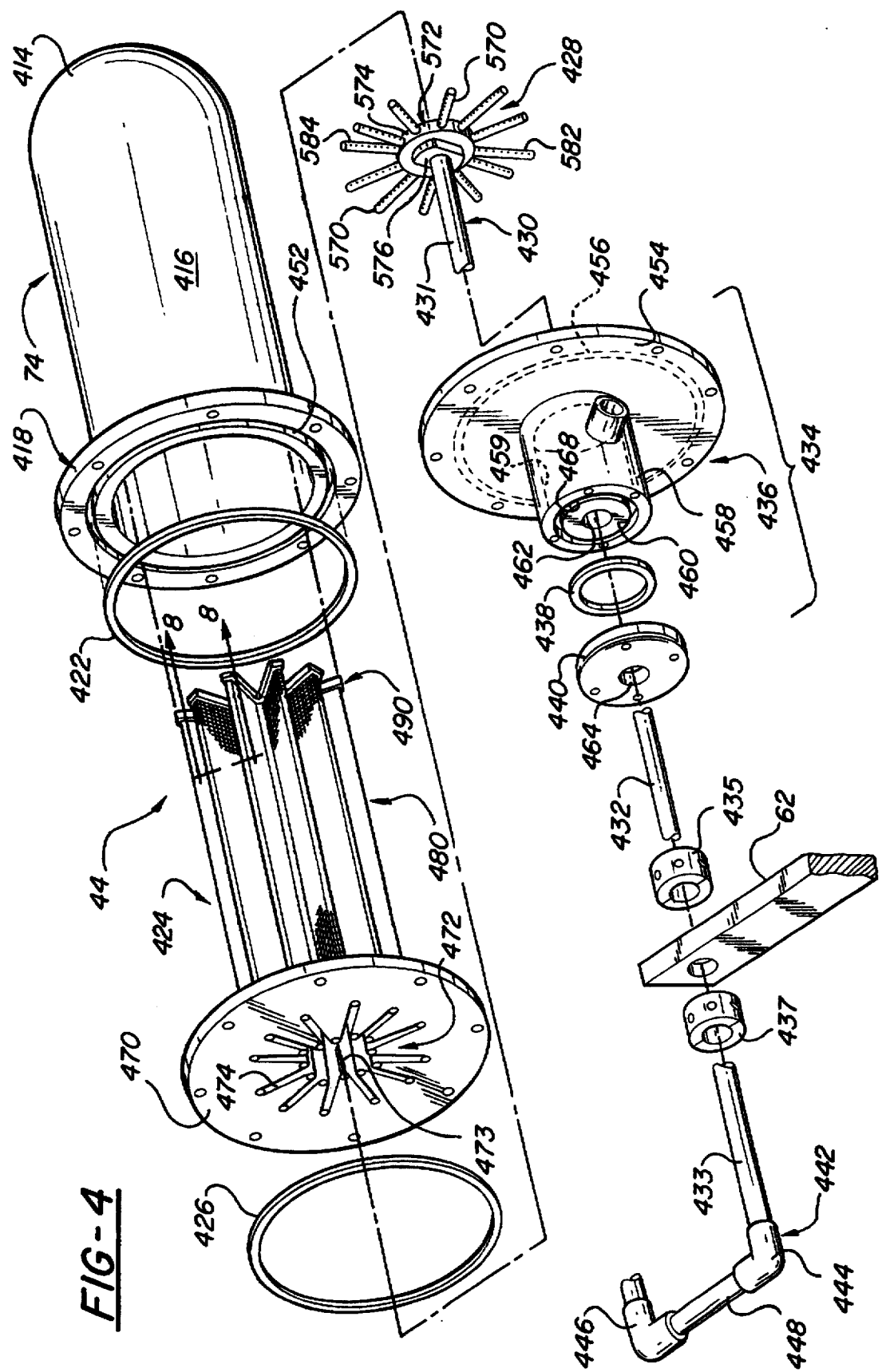
FIG. 4 is a fully exploded view of the components of one permanent filter assembly used in the FIG. 1 system.

In FIGS. 1 through 15, which will now be described in detail below, were the preferred embodiments of the parent application which covered a liquid-cleaning system and its various subsystems, assemblies and components. In FIGS. 15–24 illustrate the preferred embodiments of the present backwashable liquid filter system using rotating spray member. It should be appreciated that this description is of only one implementation of the present system and methods and that this invention, including various parts thereof, has other possible arrangements. Specifically, the equipment and methods disclosed here may be modified and implemented in various other ways without departing from the proper scope of the present invention covered by the claims below.

FIG. 1 is a simplified front view of a transportable permanent filter liquid-cleaning system 30 of which may be connected to a conventional dry-cleaning washer system 32 shown on the right side of vertical dashed line 21 in FIG. 1. The liquid-cleaning system 30 includes a base frame 34 on six wheels 36 supporting a superstructure 38 for supporting various components. System 30 includes a distillation system 40; permanent filtering system 42 provided with first and second identical permanent filter assemblies (PFAs) 44 and 46; a backwash reservoir subsystem 50; a backwash header and delivery subsystem 52. Subsystem 52 includes flexible hoses 54 and 56 to provide backwash solvent received from subsystem 50 to PFAs 44 and 46, respectively. The PFAs 44 and 46 are serviced by a common lift mechanism 58 which forms part of system 30. Mechanism 58 includes a pneumatic cylinder 60 and tie bar 62 to raise and lower reciprocating sprayer nozzle assemblies 64 and 66. Assemblies 64 and 66 form part of their respective PFAs and are largely hidden in FIG. 1 within the housings 74 and 76 of their respective PFAs. It is the sprayer nozzle assemblies 64 and 66 that are actually connected to flexible hoses 54 and 56, respectively.

The liquid-cleaning system 30 also includes an air control system 70 (shown as a box labelled "ACS" in FIG. 1). Alternatively, an electrical control system 72 (represented by the box labelled "ECS" in FIG. 1) may be provided. The ACS 70 or the ECS 72 provide power-assisted or automatic operation of various parts of the system 30. The degree of automation can be varied as will later be explained in more detail.

It is preferred, but not required, that the liquid-cleaning system 30 be quickly connectable to and disconnectable from the permanent equipment 32 it services. For this purpose and found in the upper right hand corner of FIG. 1 on either side of dashed line 21, are a first set 73 of quick disconnect fittings, represented by fittings 78, 80 and 82 and a second set 75 of quick disconnect fittings 88, 90 and 92 are provided on the system 30 and equipment 32. A set 94 of shut-off valves 98, 100, 102, 104, to the left of dashed line 21, shown in FIG. 1, and shut-off valves 106 through 118, shown in FIG. 2, may be provided to selectively close all lines prior to decoupling them at the quick-disconnect fittings. These quick-disconnect fittings or couplers may be of any conventional or suitable type, including pipe unions, as long as they are rated to handle the liquid or vapor indicated as flowing through it.

The Distillation System and Superstructure

The distillation system 40 includes an internally insulated, generally rectangular housing 124 made of sheet metal or other suitable material containing a cylindrical reservoir the still 126. The still 126 is preferably made from 0.25 inch thick stainless steel, and is arranged so that its axis is horizontal as shown best in FIG. 1. Still 126 may be any suitable such as 40 to 60 gallons in capacity. In any event, the capacity of still 126 should be greater than the sum of the capacities of PFAs 44 and 46 and the backwash reservoir to be described shortly. In the prototype of system 30, the capacity of still 126 is about 50 gallons. Still 126 has a removable access cover 128 bolted onto an annular flange 130 with a gasket therebetween to make the seal at the cover liquid and vapor tight. The system 40 also includes a water-cooled condenser assembly 134 which is used to condense distilled vapor to a liquid distillate form, and a separator assembly which is used to separate the distillate into solvent and water, respectively. The access cover 128 to still reservoir 126 may include cover 288 at the bottom center bottom of the barrel 126. The cover 288 is opened to remove the powdery sludge which remains at the end of the distillation cycle. The cover may also include a flange-mounted glass sight port 290 to check on the internal condition of the solvent being distilled within the tank.

The distillation system 40 also includes a double-helix-like mixing screw 140 inside the still 126. Screw 140 has two mixing blades 142 and 144, each supported by three arms 146 and 148, respectively, that are driven by shaft 150 journalled into ball-bearing bushings 152 and 154 at right and left ends of the still 126. The shaft 150 is driven by drive system 160 including a motor 162. A drive pulley 164 on the motor shaft is connected by belt or chain 166 to pulley 168 journalled and pinned to mixer shaft 150.

Contained in rectangular housing 124 is a heating system 170 which is preferably powered by steam, but may be electric heat provided by resistive heating units, if desired. The system 170 is made of a semi-cylindrical jacket 171 or shell welded at the edges thereof to the lower half of the outside surface of metal reservoir 126. This shell creates an enclosed semi-cylindrical steam chamber on the jacket 171 and still 126 is supported by suitable mounting brackets 176 and insulated from contact with the housing 124 by thermal insulation 180, as illustrated by the various cut-away portions of housing 124 where the insulation 180 may be seen. The insulation may be fiberglass, rockwool, or any other suitable high-temperature, non-flammable insulation material. When steam is used as a heat source, a pressure regulator 182 and steam trap and check valve assembly 184 are preferably connected to inlet line 186 and outline line 188 leading to the half-shell steam chamber 172.

Contaminated solvent to be distilled in reservoir 126 is dumped into still 126 by conduit or pipe 190 projecting through a flange-mount fitting 192 on the outside of the still 126 at upper location 194 best seen in FIG. 2.

Shut-off valves 116 and 188 are opened to allow steam from building supply 196 to flow through hose assembly 200 and coupling 206, through pressure regulator 182 to supply line 186 and into steam chamber 172. Spent steam or condensate is returned through bottom conduit 188 to steam trap 184. From there it flows through shut-off valve 118 through coupling 208 and hose assembly 202 to the condensate return line of the building steam system.

When heat is applied to the heating chamber 172, the contaminated solvent boils off, and the resulting vapor escapes through solvent vapor line 212. Line 212 leads upwardly out of still 126 at location 214 to the condenser assembly 134, which will be described shortly.

A number of components may advantageously be secured, if desired, to bulkhead supports or other rigid members of the superstructure 38. Superstructure 38 may include the following components: vertical base support base members 242 through 248, horizontal support members 250 through 262 and upward vertical support members 266 through 272. Numerous pipe clamps, such as clamps 274 and 276 at the top of FIG. 1, may be used as necessary to support the lines, valves and other components of system 30 to the members of superstructure 38. To some extent, the piping or other lines used between various subsystems and components provides the rigidity and strength necessary to support selected components. It is, thus, possible, if desired, with well-planned placement and interconnection of housings, canisters and piping to largely or entirely eliminate use of or to greatly reduce the numbers of members or amount of material used in the superstructure 38.

FIG. 2 shows the condenser assembly 134 in more detail. The assembly 134 includes a canister or housing 296 and a cover 298. Inside the housing 296 is a heat exchanger 300 cooled by water delivered from the building or cooling water supply 302 through shut-off valve 304 and hose 308 to a set of couplings leading to shut-off valve 108 mounted to the superstructure member 272. Water returns back to block 302 through line 309, shut-off valve 110 to hose 310.

Boiled-off solvent vapor to be condensed is delivered via insulated line 214 to the inside of condenser housing 296. There vapor is condensed and exits via pipe 314 into separator assembly 136. Separator 136 consists of a canister 316, cover 318 and water-based heat exchanger 320 supplied by water from lines 308 and 310. In the dry cleaning process, the distilled solvent perchloroethylene (perc) is heavier than water, so the water settles below the perc. Thus, the perc exits canister 316 via return line 324 to shut-off valve 114 connected to hose 325 and is routed to a permanent distilled solvent return line represented by box 326. Return line 326 normally leads to the main solvent tank in the dry cleaning washer system.

The water which has settled on top of the perc exits out of canister 316 via pipe 328 to shut-off valve 112, which may be connected by hose 330 to return lines leading to a waste water collection point, represented by block 332.

Solvent Supply and Return Lines For The Permanent Filter Assemblies

As best seen in FIG. 1, dirty solvent to be filtered is provided to the permanent filter assemblies 44 and 46 via coupling 82 through shut-off valve 102 to line 342. From line 342, the dirty solvent passes through a flexible conduit or hose 344 leading to a forwardwash lint strainer assembly 346. This conventional lint strainer 346 includes a cylindrical metal canister 348, a cylindrical nylon cloth bag 350 supported externally by a cylindrical coarse plastic wire frame 352 of approximately the same size. Cover clamp mechanism 354 located at the top of the strainer assembly 346 allows the lint bag to be cleaned by hand periodically. Since the bag 350 is very large, this only needs to be done once in a great while.

Strained dirty solvent then exits canister 348 at line 358. Line 358 goes to a high point 360 a minimum distance "H" above horizontal pipe 362 leading to the T-couplings 364 and 366, which are in fluid communication with the bottom of housings 74 and 76 of permanent filter assemblies 44 and 46. Downwardly directed elbow 368 connects pipe 362 to control valve 210. Opening valve 210 permits solvent to be dumped into the still reservoir 126. As will be described later, valve 210 is normally opened only during the backwashing of the PFAs. The high point 360 of pipe 358 is utilized to ensure that, during the backwashing operation when control valve 210 is opened, contaminated solvent, including filter bed materials is taken by action of gravity to still 126 through pipes 368 and 190. Without the high point 360 and pipe 358, the backwashed solvent might run down into pipe 358 into lint strainer 346. The height "H" is selected to ensure this does not occur.

During normal filtering operation, the PFAs 44 and 46 provide filtered solvent through couplings 374 and 376 to common horizontal pipe 372. The filtered solvent flows in the direction indicated by arrows 378 through a double-window sight glass coupling 380 to pipe 382. Line 382 leads to the shut-off valve 100 and quick-disconnect coupling 80. The sight glass 380 allows the general clarity of the perc to be visually monitored. The clean perc is highly transparent, while perc containing high levels of contaminations or significant quantities of diatomaceous earth or activated carbon, which occurs when the filter bed is not fully formed upon re-start up of the system 30.

The Backwash Subsystem

The backwash subsystem 50 includes a pressurizable reservoir 390, that is preferably one to one and one-half times the volumetric capacity of PFAs 44 and 46 taken together. For example, in a prototype system 30 of the present invention, each PFA has a 7.5 gallon capacity and the reservoir 390 stores 20 gallons of solvent. The reservoir 390 may be made of any suitable material, such as steel to ASME standards for pressure vessels. The reservoir 390 includes at its hemispherical top end a standard over-pressure relief valve 392, and a control valve 394 through which pressurized air is supplied as indicated by the hollow arrow. The supplied pressure may be between about 20 psig to about 100 psig, with about 50 to 75 psig being preferred for backwash purposes in the prototype system 30 used for dry cleaning purposes. The reservoir includes an overflow port 395 connected to line 396 which limits the liquid level to the height shown represented by line 398. The backwash subsystem 50 takes filtered solvent stored in backwash reservoir 390 and delivers it via line 398 to backwash lint strainer assembly 406 which is similar in construction to forward wash lint strainer 346 and may be the same or a smaller size. The exit line 408 from strainer 406 delivers fluid to the backwash manifold/header subsystem 52. Subsystem 52 includes a T-coupling 410 leading to shut-off control valves 414 and 416 which respectively supply solvent during the backwash operation to flexible hoses 354 and 356. The overflow port 395 is closed when the backwash reservoir 390 is pressurized. The valve 104 is normally open since reservoir 390 should not be overfilled. Hose 325 leads to the clean solvent return 326 as shown in FIG. 2.

In order to fill the reservoir 390 with solvent, control valve 388 is opened during the forward filtering cycle. As solvent is added to reservoir 390, the air above the liquid in the reservoir is displaced as the liquid level rises. The air travels through overflow port 395 and shut-off valve 104 to T-fitting 420 then to conduit 422, and through T-fitting 424 and opened shut-off valve 98. Shut-off valve 98 leads to quick-disconnect couplings 78 and 88 and pipe 426 leading to the solvent vapor recovery system 430. Conduit 426 is also connected to T-fitting 424 and it collects excess vapor delivered through pressure regulator 434 located on top of condenser assembly 134. Pressure regulator 434 is set to a very low value, such as 0.5 psig to 2 psig. It acts as an over-pressure relief valve for the condenser canister 296. Note that pressure relief valve 434 will likely open when backflushed solvent is dumped through shut-off valve 210 into the still 126, because of the displacement of vapors in the reservoir due to the rising liquid level in the still. Since the dump of contaminated solvent from the housing 74 and 76 is relatively quick, typically under 60 seconds, the condenser is unable to handle all of the excess vapor. Thus, pressure relief valve 434 opens and that vapor is collected by the solvent vapor recovery system 430. Note that this is accomplished by having the still 126 be sealed against leakage even during its heating cycle to prevent the uncontrolled escape of solvent vapors to atmosphere. Since all other fittings and vessels within the system 30 are solidly piped with leak-proof joints, those skilled in the art will appreciate that the above-referenced components and piping provide for the containment and collection of all solvent vapors produced by the system 30 during all phases of its operation. In this manner, the system 30 offers the advantage of substantially eliminating exposure solvent vapors even during backwashing and distillation cycles.

Referring to FIG. 2, the remaining interconnections between the transportable liquid-cleaning system 30 of the present invention and the permanent piping and equipment found at a process location, such as a dry cleaning establishment will be reviewed. The solvent vapor collection block 430 has been discussed. A shop air supply represented by block 450 provides pressurized air through hose 452 and coupling 454 to shut-off valve 106 located on the superstructure 38. Shut-off valve 106 is connected by suitable piping to air control system 70 shown in FIG. 1. The components within the air control system will be discussed with FIG. 3.

An optional electrical control system or panel represented by block 460 may be connected through multiple conductor cable 462 and connector plug 464 to connector receptacle 466 mounted on superstructure 38. Receptacle 466, in turn, is connected to optional electrical control system 72 shown in FIG. 1. Note that from a controls standpoint, a suitable electrical, electronic or computerized control system may be provided in block 460 mounted permanently within the building, or the same kind of control system may be mounted on structure 38 so that it is transportable with the system 30. Those in the art should appreciate that all of the shut-off and control valves within the system 30 may be manually operated or some of them may be automated, or all of them may be automated. Automation of valve operation is achievable through use of electrical solenoid operators on the valves and suitable digital control logic devices, such as programmable controllers, which are well known in the controls field for operating pneumatic and hydraulic control valves.

It is preferred, but not required, to use flexible lines, such as hoses, on one or both of the lines to which quick-disconnect couplings are attached. As the various arrangements of hoses in FIG. 2 make clear, hoses may be provided on the transportable system 30, as illustrated by hoses 325 and 330 for clean solvent return and waste water return, respectively. Alternatively, flexible hoses may be provided on the lines leading to the permanent equipment on the left side of dashed line 22, as indicated by flexible hoses 200 and 202. It is preferred to provide flexible hoses on the permanent side of dashed line 212, since connection lengths may vary from facility to facility. Further details about various substances and components, particularly those associated with the filtering apparatus will be described with respect to FIGS. 4 through 15.

Returning to FIG. 1, the dry cleaning washer system 32 to the right of dashed vertical line 21 will now be described. The system 32 includes a conventional dry cleaning washer 380 with a washer motor 382 driving a washing drum or tumbler 384. The washer 380 also includes a reservoir 386 with overflow wall 388 and level control valve 390 which, when in one state establishes a low liquid level 392 in basin 386 and when in the other state establishes a high level indicated by line 394 in basin 386.

The system 32 also includes a main tank 400, a main pump 402 driven by a main motor 404. The capacity of the main tank may be as large as desired relative to the other equipment and should include sufficient volume, in addition to the normal amount of solvent in the tank, to accept the sum of the volumes of PFAs 44 and 46 and backwash reservoir 390. In this manner, if the system 30 is ever emptied of solvent (such as happens prior to moving the system 30), there will be sufficient capacity in the main tank to accept it. The main pump 402 draws liquid through a strainer 406 and pumps it through pipe 408 and couplings 92 and 82 to the filter system 30.

Clean filtered solvent is provided by pipe 409 from a coupling 90 to a diverter control valve 410. In one state, diverter valve 410 directs clean fluid through pipe 412 into the washer basin 386. In its other state, diverter valve 410 causes fluid to be directed through pipe 414 into a sump 416 comprised of a cylindrical housing 417 and manually openable cover 418 which normally covers the upper open end 419 of the sump 416. The clean fluid from pipe 414 enters a downward angle and swirls around the cylindrical housing 417 before passing into the reservoir 400. The opening 419 is the spot at which the operator of the dry cleaning system adds diatomaceous earth, activated carbon, additional solvent, and additives such as surfactants or sweeteners. Permanently installed line vapor conduit 421 connected to the washer 380 leads to a solvent vapor recovery system 430. Similarly, permanently installed conduit 423 leads from the main tank 400 to the vapor recovery system 430. Solvent vapor recovery is known in dry cleaning operations. The constructions of operation of washer system 32 in conventional and will not be further described, except as necessary to help explain the operation and advantages of the liquid-cleaning system 30.

FIG. 3 is schematic diagram illustrating the components found in a preferred embodiment of the air control system 70 of the present invention. As is conventional in schematic diagrams, piping is shown as a single line. Shop air at 50 to 100 psig from line 450 delivers pressure through quick-disconnect couplings 454 and 456 through shut-off valve 460 to pressure regulator 462. The pressure regulator may be set between about 30 and about 100 psig, with 50 to 75 psig being preferred. In the prototype system 30 of the present invention, the pressure setting most preferred is 75 psig as indicated near pressure gauge 464.

Common line 466 delivers pressurized air to a first air control subsystem 468 used to regulate the raising and lowering of tie bar 62 via 60. Subsystem 468 includes a three-position five-way directional control valve 470 preferably having an integral exhaust silencer 472. Subsystem 468 also includes flow control valves 472 and 474. Flow control valve 474 is typical and includes an adjustable needle valve 476 and check valve. Energizing the "R" operator of valve 470 causes the rod 480 of cylinder 60 to be raised. Energizing the "L" operator of the directional valve 470 causes the cylinder rod 480 of cylinder 60 to be lowered. Operators "R" and "L" of valve 470 may be operated by electrical solenoid, an air-operated pilot, a manual lever or push button, as desired.

Common supply line 466 also provides pressurized air to a second air control subsystem used to power the air motor 162 in either direction of rotation, as desired. Subsystem 488 includes directional valve 490, which may be identical in construction to valve 470. Flow control valves 492 and 494 are used to regulate the speed of air motor 162 in one direction or the opposite direction. Selection of direction is achieved by actuation of the "R" and "L" operators of valve 490, so that the mixer 140 shown in FIG. 1 may be rotated clockwise or counterclockwise, as desired. This, in turn, causes the mixer 140 to rotate clockwise or counterclockwise.

The supply line 466 also provides pressurized air to a third subsystem, namely the shut-valve 394, which is preferably a normally closed, two-position, two-way control valve as shown in FIG. 3. Valve 394 is spring-returned to its normally closed position which blocks the supply of pressurized air to backwash reservoir 390. Actuating operator "C" of valve 394 shifts the valve 394 to its normally open position, thus pressurizing reservoir 390 to some maximum pressure no greater than the setting on pressure regulator 462. The pressure within reservoir 390 may be less, depending on the delivery capabilities of the backwash solvent versus the air supply. The air supply through common line 466 is preferably sufficiently great so as to positively regulate the air pressure achieved in reservoir 390, thus stabilizing the nozzle flow rates achieved in accordance with the setting of pressure regulator 462.

The air motor 362 may be replaced, if desired, by an electric motor operated by an on-off switch or the closure of a normally open relay contact or motor starter. Similarly, the air-operated cylinder 60, which raises and lowers the tie bar 62 may be replaced by an electric motor driving an acme screw through an appropriate gear reducer. Those in the art will appreciate that such changes would eliminate the need for air control subsystems 468 and 488.

Construction Details of the Permanent Filter Assembly

Figure 5:
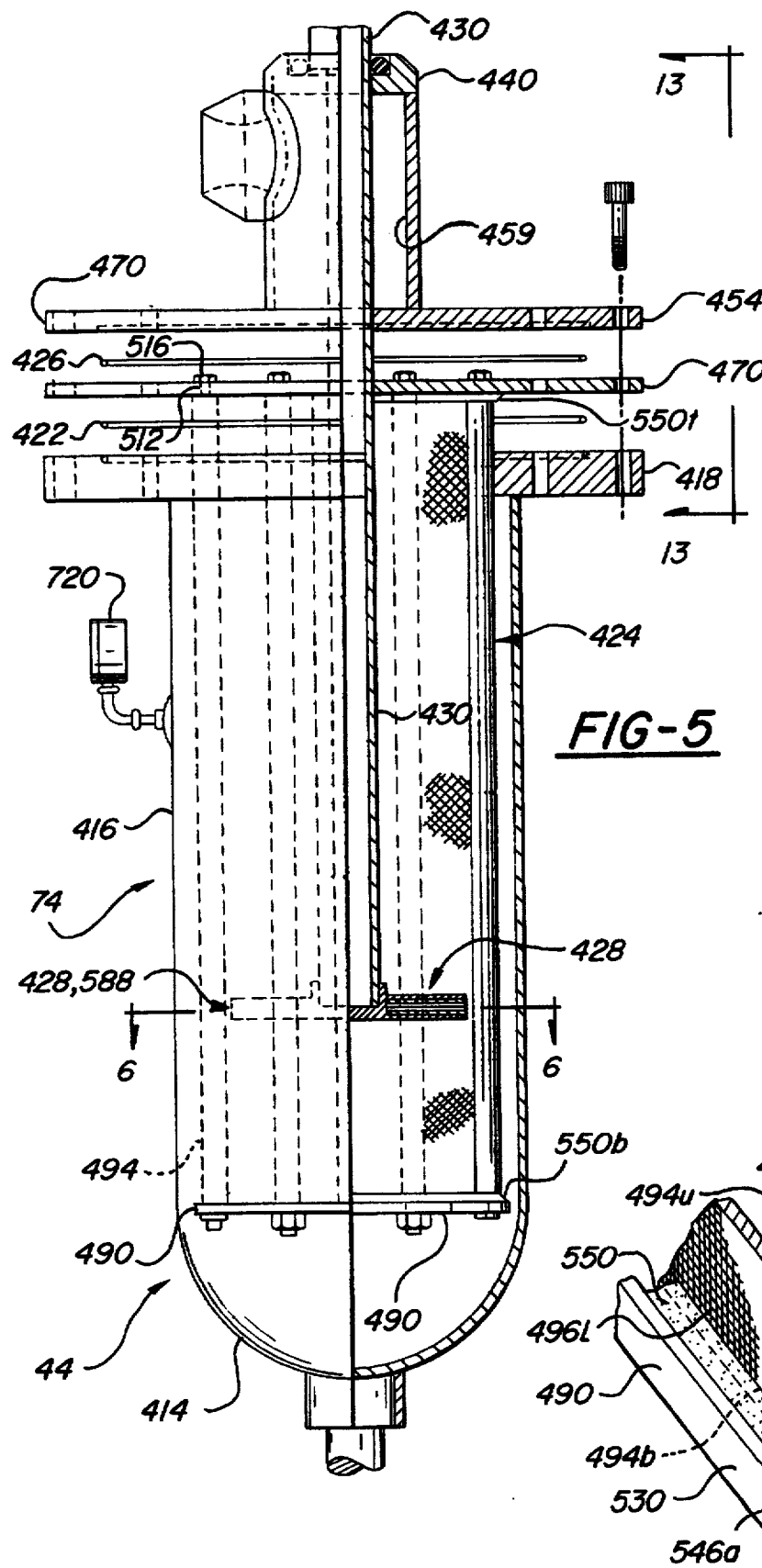
FIG. 5 is a side elevation of the permanent filter assembly of FIG. 4, partially assembled, with the right half of the filter housing broken away to illustrate how the filter cartridge assembly and reciprocating backwash/header nozzle assembly are constructed and fit together.

FIG. 4 is a simplified exploded view of several key components of permanent filter assembly 44. FIGS. 5, 13 and 15 also illustrate various portions of the permanent filter assembly. PFA 46 is identical in internal construction to PFA 44, and need not be described. PFA 44 is a pressurizable vessel which includes a steel housing 74 that has a hemispherical lower end 414, an elongated cylindrical body portion 416, and a top annular flange 418 welded to the top edge of the open end of the cylindrical portion 416. As such, the housing 74 of PFA 44 resembles an inverted bell jar. The PFA 44 also includes: a first O-ring 422; a filter cartridge assembly 424; a second O-ring 426; a sprayer nozzle structure 428 arranged in a star configuration; an elongated support pipe 430 having lower, intermediate and upper sections 431,432 and 433; a filter cover assembly 434 including a filter cover structure 436, O-ring 438 and a top cap 440; two annular ring clamps 435 and 437 disposed on opposite sides of tie bar 62; and transverse pipe extender 442, which includes elbows 444 and 446 and extension pipe 448.

The annular flange 418 of filter housing 74 includes a groove 452 for receiving O-ring 422. The filter cover structure 434 includes a flat circular cover plate 454 including a groove 456 for receiving O-ring 426. The filter cover structure 434 also includes a generally cylindrical head section 458 which may be a substantially hollow metal casting having a cylindrical internal chamber 459 substantially closed by an upper end portion 460. End portion 460 is provided with a central bore area 462 for receiving the pipe 430, which extends through structure 434. The end portion 460 of head section 458 includes a groove 468 for receiving O-ring 438.

The filter cartridge assembly 424 includes a top cartridge plate 470 provided with a multiple-point star-shaped opening 472 having a central region 473 and multiple individual finger slots 474. The number of individual finger slots 474 may be varied as desired from four to 12 or more. A greater number of finger slots is preferred since the number of finger slots is proportional to the number of pleated sections in the filter cartridge assembly 424. The greater the number of pleated sections, the greater the usable filter surface area to volume ratio of the filter cartridge assembly 424. For ease of design and to improve the surface area to volume ratio, a higher number of finger slots, such as eight, ten or twelve are preferred. The cartridge assembly 424 also includes a filter structure 480 arranged in star configuration, whose construction will be explained with respect to FIG. 5.

The O-rings 422 and 426 represent means for sealing together the sandwich formed of the annular flange 418, the filter cartridge plate 470 and the cover plate 454, so as to prevent solvent leakage. As shown in FIG. 4, a plurality of bolt holes may be provided for clamping these three pieces together in an assembled state using bolts. The bolt holes in annular flange 418 may be threaded. Similarly, bolt holes are provided in top cap 440 and head section 458 for clamping them together.

Elongated pipe 430 preferably has a machined outer surface so as to be able to reciprocate easily through the bores 462 and 464 of head section 458 and top cap 440. The outside bottom end 431 of pipe 430 is preferably threaded to fit into a complementary threaded hole in the center of sprayer nozzle structure 428.

Ring clamps 435 and 437 are preferably of split construction, with two bolts used to tighten each clamp half to the other. The ring clamps are tightened down on pipe portion 433 on opposite sides of the tie bar 62, and thus prevent movement of the pipe 430 with respect to tie bar 62. Thus, as tie bar 62 is raised and lowered by the cylinder 60 (see FIG. 1), the sprayer nozzle assembly 428 connected to the pipe 430 is also raised and lowered with the tie bar.

Construction Details of the Filter Cartridge Assembly

The construction of an exemplary filter cartridge assembly 424 is illustrated in FIGS. 4 through 9, and will now be described in more detail. Note that assembly 424 includes twelve pleated sections, but more or less could be used. The filter cartridge assembly 424 has a top cartridge plate 470 and a bottom cartridge plate 490 interconnected in spaced relation to one another by twelve inner tie rods 492 and twelve outer tie rods 494. An elongated sheet 496 of wire mesh is wrapped about adjacent inner and outer tie rods to achieve the star configuration for the wire mesh, which features multiple uniformly oriented elongated folded sections, called pleated sections above, which are best illustrated in FIG. 4 and by the dashed lines in FIG. 6. This configuration for the filter section 480 may alternatively be described as being arranged in corrugated configuration about adjacent tie rods, so as to define an interior side or chamber and an external side or chamber. The external chamber exists between the outside of the filter cartridge assembly 424 and the bell jar housing 74. It is a generally annular chamber having a smooth bell-jar shaped external surface and an internal surface having an internal star configuration.

In one prototype embodiment of the filter cartridge assembly 424 of the present invention, the tie rods 492 and 494 are eighteen inches in length, the inner tie rods 492 are 0.375 inch in diameter and the outer tie rods are 0.500 inch in diameter. These relative diameters, in conjunction with the arrangement for the tie rods best illustrated in FIG. 6, provide an internal chamber within the sheet 496 which permits the nozzle structure 428 with its twelve finger sections to be inserted into the internal star configuration opening 472 in the top filter plate 470 and slid all the way down to the bottom cartridge plate 490 of the cartridge assembly 424. In the same prototype embodiment, the sheet 496 of mesh material is about seven linear feet long and eighteen inches high, thus providing a usable area of about ten square feet of porous filter material (not counting the areas obstructed by the tie rods). The mesh material is preferably made out of stainless steel. For most filter applications, a minimum of 1,000 openings or more per square inch is required. In dry cleaning operations using diatomaceous earth, the average size of openings is preferably 125 microns or smaller. A more preferred range of sizes is 40 to 75 microns with a range of 50 to 60 micron openings being most preferred. A typical 60 micron stainless steel mesh translates to roughly to about 10,000 openings per square inch. It will be appreciated that a filter cartridge assembly encompassing the present design could have an opening size as small as approximately 5 to 10 microns. A material mesh of this size would have applications other than the discussed dry cleaning filtering applications.

As noted above, corrugated pattern of the sheet 496 around the inner and outer tie rods is best illustrated in FIG. 6. There, the cross-sectioned lines 496C and phantom lines 496P represent the placement of sheet 496 as part of the filter. These lines show that the woven mesh material is partially wrapped around adjacent inner and outer tie rods such that the inner face of the sheet 496 is in contact with the outer side of the outer tie rods, and the outer surface of the sheet is in contact with inner side of the inner rods, thus resulting in the star configuration.

The top cartridge plate 470 includes a plurality of bolt holes 510, and a plurality of locator holes 512 for the outer tie rods, and a plurality of locator holes 514 for the inner tie rods. The locator holes 512 and 514 receive fasteners 516 and 518 which are screwed into, or pins which project out, of and are centered on the top ends of the inner and outer tie rods. The precise location of these locator holes 512 and 514 on the top cartridge plate 470 is best illustrated in FIG. 7, which is an enlarged view of a typical portion of the top cartridge plate 470. These holes 512 and 514 may also be used with any fastener that serves to precisely position the inner and outer tie rods on the plate. Any suitable fasteners 516 and 518 may also be used in any similar or suitable fashion to attach the lower plate 490 to the inner and outer tie rods 492 and 494. The configuration for lower cartridge plate 490 is best illustrated in FIGS. 4, 6 and 8.

In FIG. 7, the individual elongated finger slots 474 are shown. In a typical finger slot 474, edge tabs 520, illustrated by hidden lines in FIG. 7, are located on the underside of plate 470. These edge tabs 520 extend perpendicularly downwardly from the plate 470 and serve to prevent the upper edge of the adjacent mesh material 496 represented by heavy dashed line 496A, from being pushed into the slot 474 by positive pressure exerted by the liquid solvent, and represented by vector 522, during normal filtering operations. In FIG. 8, a similar edge tab 524 is shown on lower cartridge plate 490.

FIG. 8 is a fragmentary perspective view showing the bottom cartridge plate 490 with two inner tie rods 492A and 492B and one outer tie rod 494A installed thereon. The mesh material 496 is shown wrapped around adjacent inner and outer tie rods. Note how the lower edge 496L presses against edge tab 524. The edge tab 524 thus helps prevent movement of the lower edge 496L of the mesh material relative to the frame 490 in response to the forces exerted by the liquid pressing on the outer surface of sheet 496 during normal filter operation.

FIG. 9 is a still further enlarged view of the outer end of a finger section 532 of cartridge plate 490. FIG. 9 illustrates the overlapping relationship between first and second side edge portions 496F and 496S and how they are fastened together to substantially seal the interior volume defined by the inside surface of mesh 496 from the volume within the PFA 44 outside the mesh material 496. Note that, unlike all the other tie rods 494 which are preferably cylindrical, this outer tie rod 494B attached to finger section 532 preferably has a square cross-section to facilitate providing a zero-leakage interconnection between the first and second edge portions 496F and 496S. A preferred method for attaching the first and second edge portions of the sheet 496 will now be explained. First the first edge portion 496F is tack welded to side surface 494S or the outer surface 494T of the outer tie rod 494B, as illustrated by spaced-apart weldments 544A through 544D, which may be arranged in a straight line. Next, the sheet 496 of mesh material is wrapped in star configuration around all adjacent inner and outer tie rods as shown in FIG. 6, and the sheet is pulled by the second edge portion 496S until taut. Next, the second edge portion 496S is overlapped over the first edge side portion 496F. Then, second edge portion 496S is tack welded by individual spaced weldments 546A through 546D, preferably on the outer surface 496T or opposite side surface 494U of the outer tie rod of the 494B. This second set of weldments 546 weld through the first side portion 496F to the outer tie rod 494B. In a prototype present filter cartridge 424 of the present invention, the weldments 544 were spaced approximately one-half inch from one another in a straight line and the weldments 546 were spaced one-half inch from one another along the same straight line. Thus adjacent alternating weldments 544 and 546 were spaced approximately one-quarter inch from one another along this line. A substantially leak-proof overlapping of first and second side edge portions 496F and 496S was achieved, thus forcing all liquid to be filtered to flow through the filter mesh material.

FIG. 9 also shows a preferred sealing means for preventing solvent from seeping through at the lower edge 496L indicated in FIG. 8 by multiple X's. This edge leak in FIG. 8 is preferably sealed with a conventional two-part epoxy adhesive which, when mixed together, adheres to the stainless steel sheets 496 and the metal surface of lower cartridge plate 490. Any conventional or suitable adhesive material which can be applied as a bead in a soft state and hardens into a permanent shape or substantially firm but pliant state and which is impervious to the liquid solution to be filtered can be used. A bead 550 of this kind of epoxy adhesive is shown in FIG. 9 sealing the leakage path beneath edge 496L and the surface of finger section of plate 490. The bead 550 may be of any suitable thickness. This kind of adhesive bead 550 is placed around the entire outside perimeter of the lower and upper edges of sheet 496 where the mesh material meets the top and bottom filter cartridge plates 470 and 490. This is illustrated by continuous beads 550T and 550B in FIG. 5.

Those in the art will appreciate that other means for sealing the leakage paths between the upper and lower edges of the sheet 496 and the filter plates may also be used, as long as a zero-leakage seal is established. Similarly, other techniques for coupling the side edge portions 496F and 496S of filter sheet 496 may be used.

Construction Details of the Sprayer Nozzle Structure

FIG. 4 shows a nozzle structure 428 having a plurality of elongated finger sections 570 extending radially outwardly from a central manifold section 572 having a disc-shaped portion 574 and an oblong pipe connection section 576. The lower end portion 431 of elongated pipe 430 is fastened into a centrally located bore formed in the oblong section 576, which is in fluid communication with an internal distribution manifold or chamber leading to individual elongated chambers inside of each finger section. The elongated finger sections 570 are equiangularly spaced from one another in a common plane which is perpendicular to the axis of the elongated pipe 430. Finger sections 570 correspond in number to the number of elongated finger sections 474 of opening 472 in filter cartridge plate 470. The finger sections 570 may each be separately made, and then threaded or otherwise fastened into radially arranged bores in the circumferential edge of disc 574, as suggested by FIG. 4.

The finger sections 570 are slightly smaller in width than the openings 474 for clearance purposes. In the prototype permanent filter assembly 44 of the present invention, which is about ten inches in diameter across the housing 74, the finger sections 570 have a total clearance of less than 0.2 inches, which means less than 0.1 inch per side. In the prototype, this clearance is in the range of 0.05 inch to about 0.10 inch between the finger section 570 and the adjacent edge of the elongated finger section 474 of opening 472. This same basic clearance, noted as clearance 580 shown in FIG. 12, is maintained between the inner surface of sheet 496 and the finger sections 570.

In FIG. 4, the elongated finger sections 570 are shown to have a substantially cylindrical shape. Finger sections 570 are provided with first and second sets of tiny spaced openings on opposite sides of the finger sections in the general plane of the nozzle structure 428. These openings may have a diameter in the range of 0.01 inches to about 0.05 inches or more, and may be spaced apart from one another at a distance approximately equal to one to five times the average diameter of the holes. While these two sets of diametrically opposed tiny holes may prove suitable for cleaning permanent filters 424 in some applications, tests have shown that they do not do a completely satisfactory job of cleaning filter bed materials like a mixture of diatomaceous earth and activated carbon powder caked onto a stainless steel mesh sheet 496. For this more demanding application, an improved nozzle structure 588, illustrated in FIGS. 6, 10, 11 and 12, was developed and will now be described. Note that because the overall geometry of sprayer nozzle structures 428 and 588 are essentially the same when viewed in transverse cross-section, and since both have a central bore in their manifold section for receiving elongated pipe 430, they are physically interchangeable with one another. Since the elongated chambers within finger sections 572 and the central distribution chamber of nozzle structure 428 are similar in arrangement and performance to those in nozzle structure 588, only those internal chambers of structure 588 will be described, since they are fully illustrated in the Figures discussed below.

Construction Details of Improved Nozzle Structure 588

Nozzle structure 588 produces multiple thin sheets of liquid flowing at high velocity from very thin elongated slots which take the place of holes 582 and 584 shown in the finger sections 570 of nozzle structure 428. These thin sheets emanating from the slots of nozzle structure 588 do a much better job of cleaning diatomaceous earth and activated carbon off of filter bed sheet 496 of the filter cartridge assembly 424 than do the multiple individual streams emanating from holes 582 and 584.

Referring now to FIGS. 6 and 10, it may be seen that nozzle structure 588 is made of two major pieces, namely a very squat base plate member and a flat cover plate 594. Members 592 and 594 are preferably formed of a suitable metal such as stainless steel casting or a powdered metal alloy casting, that is then finished machined into the desired shape. Both members 592 and 594 have a major plane that is transverse to the central axis of the pipe 430. Structure 588 has an enclosed central manifold section 596 and twelve elongated finger sections 600 extending radially outwardly from the central manifold section 596 and equally equiangularly spaced from one another in a common transverse plane.

Each elongated finger section 600 has a top wall portion 602 which is part of the cover plate 594. Each finger section 600 also has a bottom wall portion 604 and two opposed side wall portions 606L and 606R, and an enclosed end portion 610, which are all part of the base member 592. Each finger section 600 also has two opposed elongated slots 612 provided by machining away a very thin part of the top of opposed side wall portions 606. FIG. 12 shows the outer portion of an exemplary finger section 600 with its opposed side wall portions marked by reference numerals 606L and 606R and its opposed slots identified by numerals 612L and 612R.

As best shown in FIGS. 6 and 10, the nozzle structure 588 has formed in base member 592 a central manifold chamber 614 and 12 elongated chambers 620. The elongated chamber 620 in each elongated finger section is enclosed by the bottom wall portion 604, the two opposed side wall portions 606 and the enclosed end portion 610. The chamber 620 is in open fluid communication with the central chamber 614. The fluid flow capacity of each elongated chamber 620 in the finger section 600 is significantly greater than the fluid flow capacity of the two opposed slots 612 in each finger section. Thus when liquid is provided via pipe 430 to the central manifold chamber 614 of nozzle structure 588, all of the slots 612 in the finger sections 600 present a high resistance to fluid flow, thereby enabling back pressure to develop in each elongated chamber 620 so as to expel liquid equally from each of the slots 612 in the finger sections 600 and at relatively high velocity.

FIG. 6 shows that the central manifold chamber 614 of nozzle structure 588 is bounded by twelve interfinger web sections 622 equiangularly spaced about the manifold area within a common annular region centered about the central axis. The web sections 622 are found in an annular region 626 surrounding the pipe 430 and in an annular region 626 in the central section 596 of the base member 592. The portion of the web sections 622 in the base member 592 support the cover plate. The cover plate 594 is rigidly fastened to the base 592 at the inside region 626 by fasteners 628 and in region 626, fasteners 630 in holes 634 and 636 found at the outer ends of the finger sections 600 in the cover and base members 592 and 594, respectively. Fastener 628 is most clearly shown in FIG. 10, and fastener 630 is most clearly shown in FIG. 11.

In nozzle structure 588, each slot 612 has a longitudinal dimension in a generally radial direction that is about 30 to 75 times larger than the height of the slots (i.e., the dimension parallel to the central axis of pipe 430). In particular, it is preferred to have a longitudinal dimension for the slot that is at least 50 times larger than the slot's height dimension. The typical height of the slot 612, illustrated as dimension 632 in FIG. 11, is preferably no greater than 0.05 inch. Smaller dimensions, such as 0.03 inch or 0.015 inch are preferred. A slot height of no greater than 0.010 inches was used in the prototype nozzle structure 588 of the present invention with very successful results for the geometry previously described, and thus is most preferred for the prototype PFA 44.

The geometry of slots 612 was further developed to ensure complete cleaning of those portions of sheet 496 adjacent the outer tie rods 494. This preferred geometry is illustrated in FIG. 12. Arrows 634 illustrate the general direction of the two opposed thin elongated continuous streams of liquid produced by slots 612L and 612R of a typical elongated finger section 600. Arrows 636L and 636R indicate how the flow in the vicinity of end portions 610 of the finger section is directed outwardly to clean edge regions 633 in the vicinity of and running the length of outer tie rod 494. This improved cleaning action of region 633 of sheet 496 was achieved by smoothly grinding away the triangular regions 640L and 640R of the base member at each finger section 600, which has been stippled in FIG. 12 for identification purposes. This improved machining for slots 612 helped assure virtually 100 percent cleaning of the permanent filter material 496, especially adjacent the outer tie rods.

Construction Details of Filter Cover Assembly 434

FIGS. 4, 5, 13 and 14 show the preferred construction for the filter cover assembly 434. Assembly 434 was described in some detail with respect to FIG. 4. Thus only additional details not previously mentioned will be described. FIGS. 13 and 14 show the internal construction of head section 458, and how fluid from the internal chamber within filter cartridge assembly 424 exits the cartridge through a plurality of holes 650 located about a central bore 652 in the filter cover plate 454 and thereafter are conveyed through to horizontal plate 372, as shown in FIG. 1 and in FIG. 13. The elongated pipe 430 supporting the nozzle structure 428 or 588 for reciprocation is supported by a bushing 656 which is press-fit into the bore 658 in the head section 458. A spring loaded elastomer gasket 672 is provided in the head section 458 around the pipe 430 to prevent leakage of solvent passed bore 464 in the cap 440.

Those in the art will appreciate from FIG. 13 that the pipe 430 is thus confined in all radial directions by the bore 462 of bushing 656 and the central bore 652 in filter cover plate 454. Since pipe 430 is supported in two distinct places, this helps ensure that the nozzle structure 428 or 588 remains centered on the axis of filter cartridge assembly 424 as the nozzle structure is moved up and down by the lift mechanism 62 during the backwash cycle. During the normal filtering operation, the pipe 430 is in its lowered position as shown in FIG. 13. The split ring 435 rigidly clamped onto the upper portion 433 of pipe 430 prevents the pipe 430 from going down any further. During the backwash cycle, the nozzle structure 428 or 588 is raised and lowered once at a predetermined rate of travel, as will be further explained.

The dashed arrows 680 indicate the direction of filtered liquid flowing out of the cartridge 424 into the chamber 459 of the head section 458. Dashed arrow 682 illustrates that the filtered liquid then flows out a hole 684 which is threaded and supports pipe 686 leading to coupling 374. As shown in FIG. 13, top cover plate 454 of cover assembly 434 includes a cylindrical recess 690 which is in fluid communication with the holes 650. Recess 690 is located above cover plate 470, and provides the necessary pathway for fluid flowing out of the star configuration opening 472 in plate 470 to permit the slots 474 to be drained directly. To ensure minimum resistance to fluid flow, the combined area of the eight bores 650 and filter plate 654 preferably exceeds the fluid flow capacity of bores 684 and horizontal pipe 372 by a factor of 1.5 or more. This also ensures that there is no appreciable pressure buildup inside of filter cartridge 424 during normal filtering operation. By having the liquid pressure within the internal chamber of the filter cartridge 424 and chamber 459 of filter cartridge assembly 434B as low as possible, the pressure differential existing across the filter bed formed on filter sheets 496 is maximized, which results in maximum throughput from the PFA 44.

Construction Details for Backwash Manifold and Hose Assembly 52

FIG. 15, in conjunction with the FIGS. 1, 2 and 13, completely illustrate the essential features of the backwash header and delivery subsystem 52. Details of the subsystem 52 not previously described will now be discussed, particularly with reference to those components associated with PFA 44. As can be seen in FIG. 15, these piping and hose interconnections to PFA 46 are identical to those for PFA 44, but simply flipped in a mirror image around an imaginary transverse vertical plane equidistant between the two pressure vessel housings 74 and 76. As previously described, the backwash liquid from reservoir 390 is delivered via a conduit 408 to a T-coupling 410 representing the beginning of the backwash manifold. Thereafter the liquid is equally divided and flows through control valves 414 and 416 leading to hoses 54 and 56 respectively. The control valves 414A and 416A in FIG. 15 are shown as the manually operated type, since each has a hand lever. As previously described, the backwash liquid in hoses 54 and 56 runs into the central pipe of the sprayer nozzle assemblies 64 and 66, the liquid is then sprayed out through the slots in each nozzle structure at the inside surface of the filter sheet in each filter cartridge to produce the localized high velocity cleaning of the mesh filter. Note that this technique for backwashing not only uses relatively low flow rates, but it also does not significantly raise the pressure inside of filter cartridge 422.

In order for the backwash liquid to reach hoses 54 and 56, control valve 414 and 416 must be open. At the same time the backwash liquid is being delivered through hoses 54 and 56 to the sprayer nozzle assemblies, the lift mechanism 58 is cycling up and down at a controlled rate of speed determined by the settings of the flow controls 472 and 474 shown in FIG. 3. The arrow 690 in FIG. 15 represents the tie bar 62 being raised, which simultaneously raises the sprayer nozzle assemblies 64 and 66, as indicated by arrows 692.

The horizontal extender pipe 442 ensures that the hose 54 is able to hang vertically downward from elbow 446. This ensures that the top filter plate 454 does not interfere with the vertical movement of hose 54.

Another important feature of the subsystem 52 shown in FIG. 15 is that the two end portions 694B and 694E of hose 54 are spaced apart from one another horizontally to ensure that hose 54 has a very generous bending radius, so that it can be freely raised up and down without generating any significant lateral forces that are applied to the elbow 446. In the prototype subsystem 52 of the present invention, the two ends 694B and 694E are about 18 to 24 inches apart.

To further ensure that the torsional forces are not unnecessarily applied through hose 52, a swivel coupling 704 is used at the end 694B of hose 54. A similar swivel coupling 706 is used at the end 696B of hose 56. These couplings 704 and 706 respectively allow hose ends 694B and 696B to move freely in a vertical plane parallel to the major axis of tie bar 62. This freedom of movement in the vertical plane is indicated by arrows 708 and 710 in FIG. 15. Those in the art will appreciate that this tandem arcuate hose assembly arrangement with swivel couplings for providing movement in one vertical plane, while providing clearance from the housings 74 and 76 through use of extender pipes such as pipe 442 perpendicular to this vertical plane, represents an efficient use of space which provides for maximum free movement of the two hose assemblies in a compact space, without interfering with one another.

In FIGS. 13 and 15, conventional pressure gauges 714 and 716 are shown tapped into the backwash lines on the top of the PFAs, for example, at elbow 444. Similarly, pressure gauges may be provided in any other line or reservoir to monitor any pressure desired. For example, in FIG. 5 pressure gauge 720 is used to monitor upstream pressure of dirty liquid in the outer chamber of housing 74.

Operation of the Liquid-Cleaning System

Those skilled in the field of designing and manufacturing liquid filtering systems will very likely understand all points necessary to operate the liquid-cleaning system 30 of the present invention in its proper sequence without any further explanation. Nevertheless, the general sequence of operation will now be discussed.

When the filtering system is first used, the main pump 402 in the washer system 32 is turned on. This forces liquid to flow through couplings 92 and 82, through pipe 342, through lint strainer 346, up pipe 358 into pipe 362, which leads to the bottom of housings 74 and 76 of permanent filter assemblies 44 and 46 respectively. Next, this unfiltered liquid presses through the sheets 496 to filter material in the filter cartridges of PFAs 44 and 46. The filtered liquid emerges from the top cover assemblies at couplings 374 and 376. Then the filtered liquid travels along pipe 378 through sight glass 380 and shutoff valve 100 and couplings 80 and 90 to pipe 409 in the washer system 32. Then diverter valve 410 directs the flow either to the sump 416 in the main tank 400 or to the washer 380 through pipe 412. After the filtered liquid has run through the washer 380, it is also returned to the main tank 400.

To establish the bed of filter material on the filter sheets 496 in the PFAs, appropriate amounts of diatomaceous earth and activated carbon are added to the sump 416. After a few minutes of operation of main pump 402, these two substances deposit themselves in a bed upon the filter sheet 496 in each PFA. Those in the art will appreciate that with a 60 micron mesh screen, the diatomaceous earth will be caught first by the perforated sheet, and then the activated carbon particles, which are much finer, will be caught by the layer of diatomaceous earth forming on the filter. Because the liquids follow the path of least resistance through the filter, the earth and activated carbon deposit themselves quite uniformly on the two filters, so that a relatively uniform thickness and filtering action is achieved on all active porous areas of the filter beds in the PFAs 44 and 46.

The main pump 402 remains on continuously. Load after load of clothing may be dry cleaned in the washer 380. After a suitable amount of clothing has been washed (as determined by weight and degree of soiling in accordance with professional dry cleaning standards), the dry cleaning liquid solution, composed primarily of perc, will need to be cleaned through distilling. At the same time the filter bed materials previously added to the filtering system must now be discarded and replaced with new materials. This is because the diatomaceous earth and in particular the activated carbon have accumulated or absorbed various known contaminants such as dirt, natural acids, odors and the like. In order to clean the permanent filter cartridges in PFAs 44 and 46, the system 32 must be put through its backwash cycle.

Before beginning the actual backwashing, the backwash reservoir 390 must be filled, if this has not already been done. Filling reservoir 390 is accomplished by opening valve 388 when the main pump 402 is running. Filter liquid in line 372 will travel through coupling 384 and open valve 388 into backwash reservoir 390. Once filled up to line 398, which is the level of the overflow port 395, the shutoff valve 388 is closed and the shutoff valve 104 associated with the overflow port 395 is closed. Next, air valve 394 is opened, allowing pressurized air, preferably at 50 to 75 psig, to flow into the backwash reservoir 390. The main pump 402 is turned off. Also shutoff valve 100 is closed.

Once the air pressure backwash reservoir 390 has stabilized, the valve 414 and 416 in the backwash manifold are opened, and at about the same time valve 210 leading to the still is opened. Pressurized backwash liquid then runs through the backwash manifold subsystem 52, through hoses 54 and 56 to the pipes 30 leading to the sprayer assemblies. At about the same time, directional control valve 470 is operated to first raise the tie bar 52, thus raising the sprayer nozzle assemblies as well in the PFAs. When cylinder rod 80 reaches the top of its stroke, the control valve 470 switches state to lower the tie bar 62. This lift mechanism cycle just described preferably takes 10 to 40 seconds to complete, with about 20 to 25 seconds being preferred. This represents 10 to 12.5 seconds for the raising of the tie bar, and about an equal amount of time for lowering the tie bar.

During this backwash cycle, all of the filter bed material forced off the filter sheets 496 in each PFA is carded by action of gravity into the still 126. Once all of the backwash liquid in reservoir 390 has been used, the system 30 can be restored to its original starting condition. In other words, valve 212 leads the still 126 which is closed. Backwash fill valve 3 and backwash inlet supply 414 and 416 are closed, and overflow port valve 104 and valve 100 is opened.

Note that the still may now be operated in a conventional sequence, known to those in the art which need not be described here. The prototype still of the present invention takes approximately two hours to completely evaporate the 35 gallons of solvent. Note that if the main tank 400 has a sufficient amount of liquid solvent in reserve, the filtering of the dry cleaning solvent may be continued and the washer system 32 may be operated, even as the still is processing the spent solvent.

The pressure filter assemblies 44 and 46 are preferably operated with a differential pressure across each filter sheet 496 equal to 8 to 18 psig or more. Higher flow rates are obtained by higher differential pressures in the preferred range of 12 to 18 psig.

Backwashable Liquid Filter Cleaning System using Rotating Spray

Figure 16:
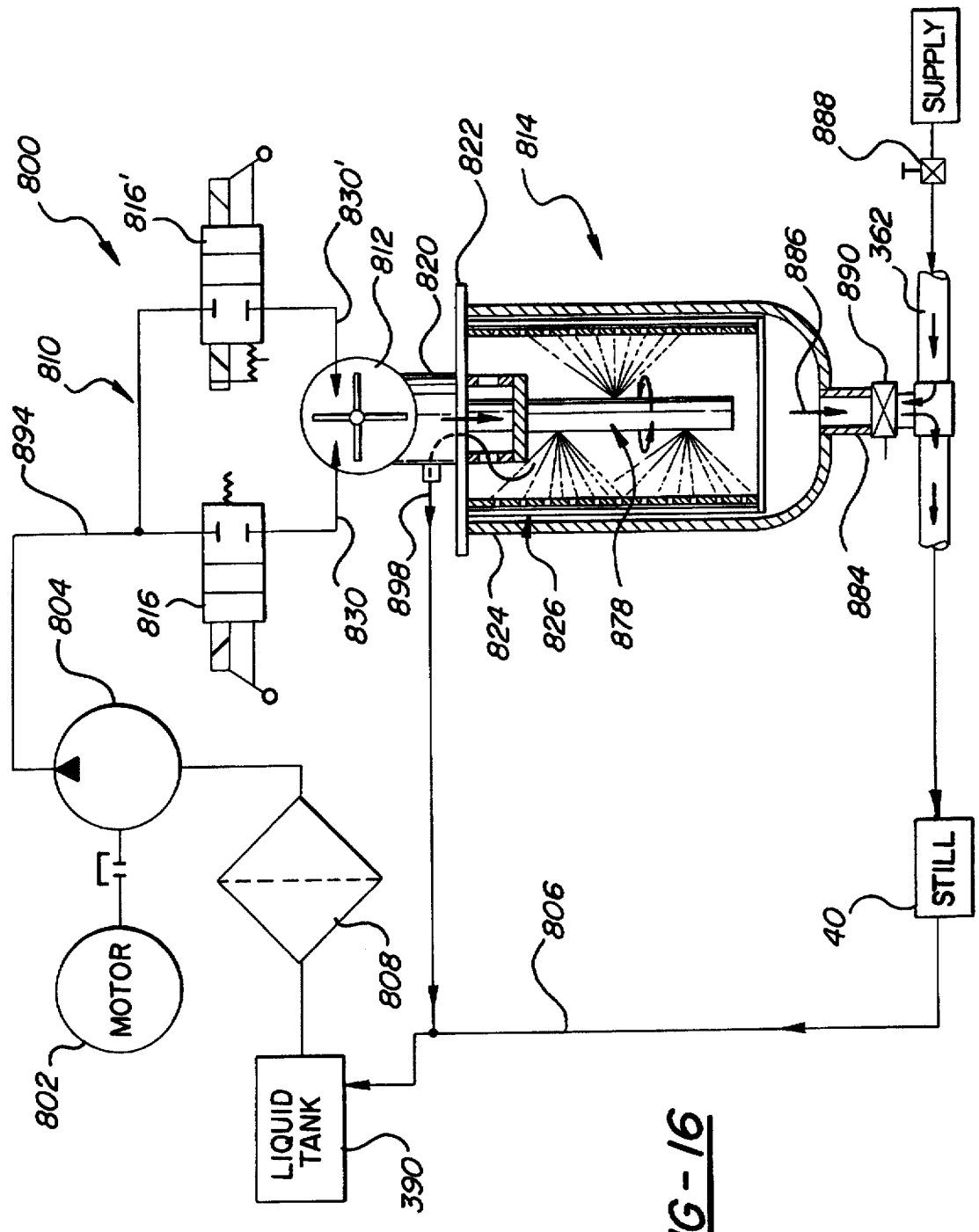
FIG. 16 is a schematic diagram of an alternative embodiment backwashable filter cleaning system.

FIG. 16 represents an alternative embodiment backwash filter cleaning system 800 which is an improvement to the system illustrated in FIGS. 1–15. Where possible, like numbers will be used to identify identical components. While a system for cleaning perchloroethylene in a dry cleaning operation is disclosed, it will be appreciated that such system could possibly be utilized wherever filter separation of a liquid is desired. Such system is operable to recycle industrial wastes that are often created during the manufacturing process. Thus, it is contemplated that a bank of filter cartridge assemblies could be arranged in parallel with one another in order to effectively reclaim/recycle mass volumes of liquid in a timely manner. A single permanent filter assembly 814 as disclosed in FIG. 16 is operable to process 60 gallons of industrial waste per minute.

The Filter cleaning system 800 includes an electric motor 802 that drives a fluid pump 804, a fluid backwash reservoir 390 connected by pipe 806 to a distillation system 40, a filter 808, a fluid flow control system 810 which controls the direction of a multi-directional liquid motor drive 812, and an improved permanent filter assembly 814. It will be appreciated that the pump 804 may be driven by other means, for example, pneumatics or hydraulics. The fluid flow control system 810 preferably includes a pair of manually operated solenoid valves 816 and 816' for controlling the direction of the reversible motor drive 812 which is shown schematically in FIG. 16. It will be appreciated that the solenoid valves 816 could be electronically actuated valves if so desired.

Figure 17:
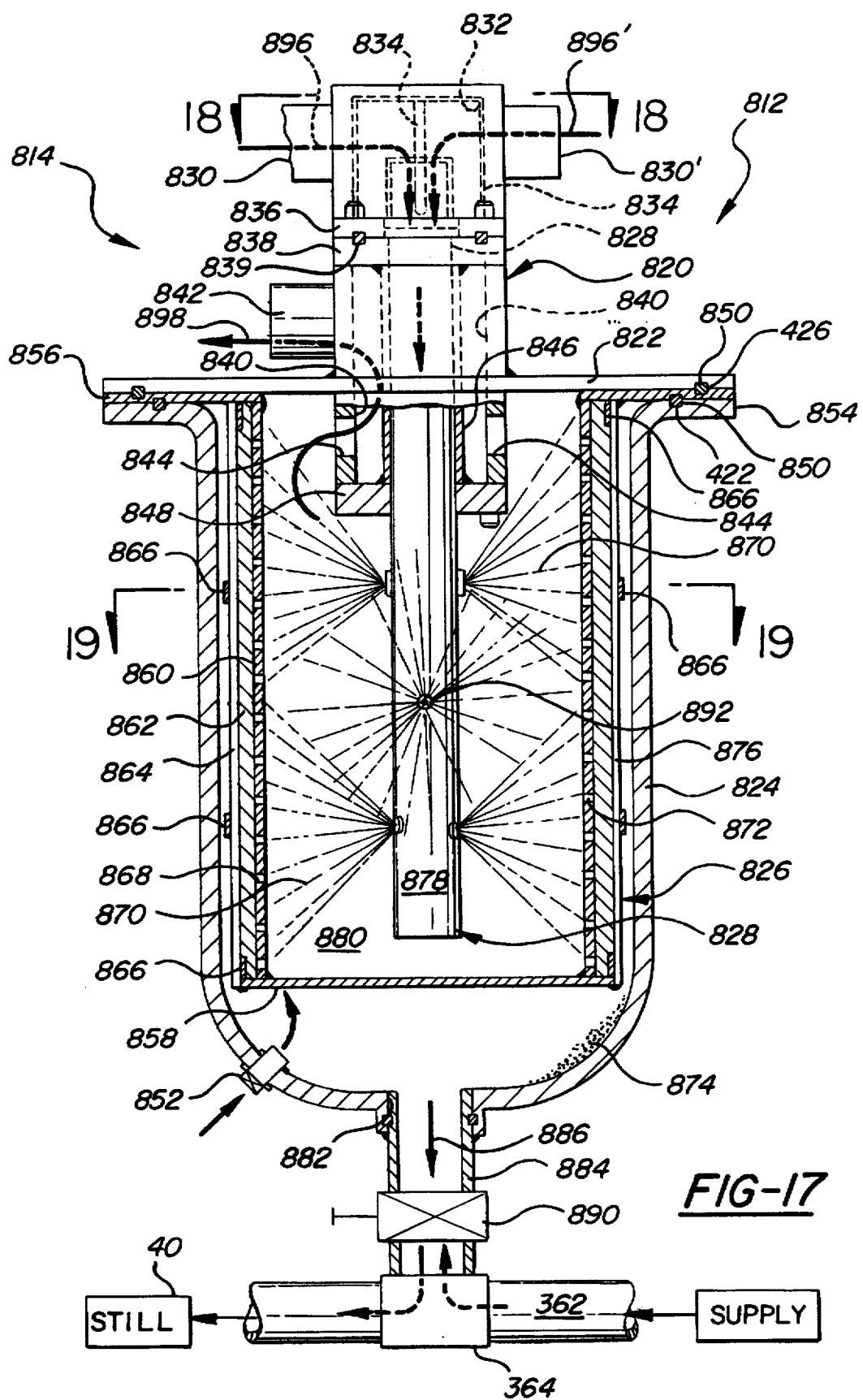
FIG. 17 is an enlarged side elevational view of the permanent filter assembly of FIG. 16, illustrating how the filter cartridge assembly and the rotating nozzle assembly are constructed and fit together.
Figure 18:
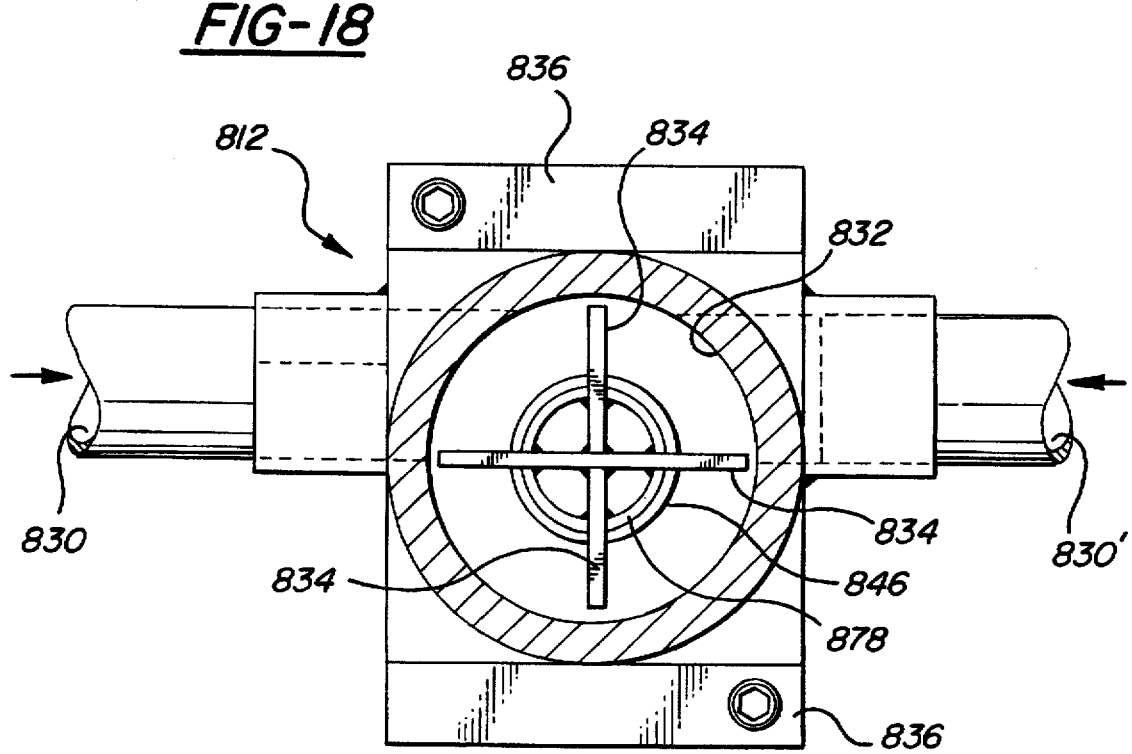
FIG. 18 is an enlarged top view taken along line 18—18 of FIG. 17, illustrating how the fluid pump and nozzle assembly are connected.

The fluid filter assembly 814 is comprised of a head section 820, the multi-directional liquid motor drive 812, a flat circular cover plate 822, a filter housing 824, a filter cartridge assembly 826, and an elongated nozzle assembly 828. With reference to FIGS. 17 and 18, the liquid motor drive 812 is a fluid pump having dual inlet passages 830 and 830' which lead to a central cavity 832. Located within the central cavity 832 is a set of pump vanes 834 that are a part of and affixed to the upper end of the nozzle assembly 828 preferably by a weld. Because of this arrangement, the nozzle assembly 828 and the pump vanes 834 rotate at the same velocity. The preferred velocity is approximately 10 rpm. The liquid motor drive 812 also includes a lower flange 836 that is secured by conventional fasteners to an upper flange 838 of the head section 820. It will be appreciated that conventional seals 834 may be located between these flanges in order to prevent any leakage therebetween.

The head section 820 is preferably cylindrically shaped and includes an internal passageway 840 for fluid flow during the normal dry cleaning filtering mode of operation. An outlet port 842 is provided for directing the cleansed Perchloroethylene to liquid tank 390 or to other parts of the dry cleaning machine during normal dry cleaning operations. At the lower end of the head section 820, there is a plurality of inlet passageways 844 which allows the cleansed Perchloroethylene to be directed out of the filter housing 824 and into the passageway 840. A sleeve 846 is secured to the upper flange 838 and to a base 848 of the head section. The base 848 is secured to the wall of the head section 820. The sleeve 846 is operable to guide the nozzle assembly 828 as it rotates.

Affixed to the head section 820 is a flat circular cover plate 822 that has a bore in the center for the head section 820 to extend therethrough. The cover plate 822 is also provided with a groove 850 that receives an O-ring 426 for preventing leakage.

The filter housing 824 is a pressurizable vessel similar to the steel housing 74 that was described in FIG. 4. Accordingly, no further discussion will be presented. However, the filter assembly 824 does include an auxiliary inlet passageway 852 with a control valve for delivering contaminated fluid that needs to be filtered by the backwashable filter assembly 814. Furthermore, the filter housing 824 has a groove 850 located in its annular flange 854 for receiving an O-ring 422. The cover plate 822 and the filter housing 824 are secured by conventional fasteners at various locations around the periphery of the annular flange 854.

Figure 19:
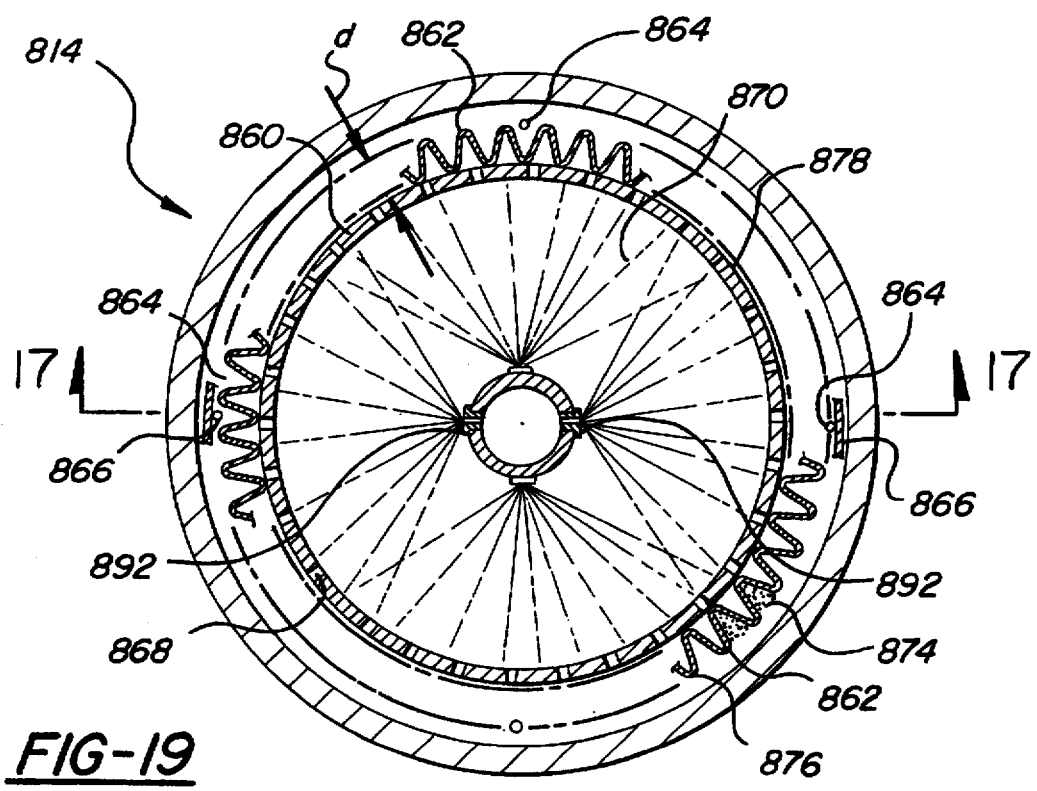
FIG. 19 is an enlarged cross-sectional view taken along line 19—19 of FIG. 17, illustrating how the nozzle, filter cartridge and filter housing are assembled.

Referring now to FIGS. 17 and 19, the details of the improved filter cartridge assembly 826 and nozzle assembly 828 will now be discussed. The filter cartridge assembly 826 is a permanent type filter comprised of an upper circular plate 856, a space-apart lower circular plate 858, an inner perforated sheet 860 that is preferably made of stainless steel and is cylindrically shaped, a corrugated-shaped outer mesh 862 located adjacent to the screen 860, a set of support rods 864 that extend between the plates 856 and 858, and a plurality of cylindrical bands 866 for securing the mesh 862 in place. The perforated sheet 860 preferably has one-half inch openings 868 which allow the high pressure streams 870 of fluid to pass through the openings 860 and onto the inner surface 872 of the mesh material 862. This allows the built-up residue 874, (i.e., diatomaceous earth, activated carbon and other contaminant particles) to be blasted away from the outer surface 876 of the filter cartridge. The perforated sheet 860 is preferably welded to the upper and lower plates 856 and 858. The structural support rods 864, preferably made of stainless steel, are also welded to the plates 856 and 858 for adding rigidity to the cartridge assembly.

With reference to FIG. 19, the corrugated-shaped mesh 862 is illustrated. It is preferred that the depth(d) of the pleating of the mesh be approximately ¼ of an inch to ½ of an inch. This is important because it enhances and maximizes the total square area of the overall filtering capability of the present system. It will be appreciated that other configurations, other than illustrated, are within the scope of the present invention. Because of the design of the mesh 862, bands 866 are used to help crush the mesh 862 against the more rigid perforated sheet 860. Further, a peripheral weld is provided to secure the pleated mesh 862 to the perforated sheet 860, and/or to the upper and lower plates 856 and 858. This design provides a durable permanent backwashable filter cartridge assembly capable of being repeatedly cleansed to a pristine state and repeatedly reused.

The nozzle assembly 828 preferably includes an elongated nozzle shaft 878 that extends up into the cavity 832 of the liquid motor drive pump, through the head section 820, into the open cavity 880 of the filter cartridge 826, where it then terminates. The filter housing 824 has a drain opening 882 that receives a pipe 884. The lower end of the pipe 884 is connected to a conventional flow control valve 890 that receives fluid from conduit 362. The conduit 362 is fed by a supply source such as dry cleaning machinery. The nozzle assembly 828 further includes a plurality of spray nozzles 892 that are strategically placed around the periphery of the nozzle shaft 878. The nozzles 892 should be positioned in order to provide an overlapping of pressure streams 870 as well as to make certain that the pressure streams 870 cover the entire inner surface 872 of the mesh 862 during a complete cycle of operation. A cycle is one complete 360° revolution of the nozzle shaft 878. Each nozzle 892 is secured to the nozzle shaft 878 by conventional methods.

Referring back to FIG. 16, the solvent that gets recycled/filtered by the filter assembly 814 contains quantities of particles such as dirt, diatomaceous earth and activated carbon. These particles accumulate on the outer surface of the filter cartridge assembly 814 during the normal filtering mode of operation. During the filter backwash mode of operation, these particles are blasted off the filter cartridge 826 and travel in the direction of arrow 886. In a dry cleaning operation, these particles are separated in the still of the distillation system 40 by the evaporation method that was described in the operation of the liquid cleaning system section of this specification. Once distilled, a quantity of refined perchloroethylene may then be redirected through conduit 806 to the backwash receiver holding tank 390 where it may be later used for a backwashing cycle.

The operation of the permanent filter backwash system 800 will now be described. During the normal filtering mode of operation, contaminated solvents such as perchloroethylene from a dry cleaning operation is supplied from a supply source, through a control valve 888, conduit 362 and into the housing 824 where it then passes through the filter cartridge 826, open space 880 and then in the direction of arrow 898. The motor 802 and pump 804 are not activated during the normal filtering mode of operation. This filtering mode of operation continues until the operator ascertains that it is time to either backwash or terminate the entire process. It will be appreciated that it is important to backwash the filter cartridge 826 whenever the mesh 862 becomes sufficiently clogged to prevent proper cleansing action during the normal dry cleaning mode of operation. Once a determination has been made that the filter needs to be cleaned, the entire filter cartridge assembly 826 can be returned to a pristine state with only a few minutes of down time and with no disassembly of the filter system 800. This is accomplished by closing off the flow of solvent to be filtered through valve 888 and for auxiliary inlet passage 852 if it is being used. Valve 890 remains open during the backwash mode. It is preferred that the solvent remaining within the housing 824 be removed prior to the backwashing mode. This task should be naturally accomplished by such fluid naturally gravitating towards the still 40 or some other drainage member if a still is not being used (not shown). This will allow the high pressurized streams of backwash fluid to be transmitted through the air and directed onto the filter cartridge assembly.

The next step of operation includes activating the motor 802 which causes pump 804 to begin exerting pressure in line 894. Next, the operator may selectively operate either valve 816 or 816' at predetermined time intervals. Thirty second time intervals are preferred. The motor 802 and pump 804 should have sufficient capacity to cause the pump vanes, and the nozzle shaft 878 connected thereto, to rotate at least 10 rpm. Thus, by selectively activating valve 816 for approximately 30 seconds, the nozzle shaft 878 will rotate in a clockwise direction. Meanwhile, fluid travels from line 894 to port 830 and in the direction of arrow 896, through the upper portion of the nozzle shaft 878, where the pressurized fluid is ultimately passed through the plurality of spray nozzles 892. This causes a plurality of high pressure spray streams 870 to be injected through the air, onto the screen 860, through its openings 868, and onto the inner surface 872 of the mesh 862; thus causing the built-up material 874 to be blasted off, which in turn, trickles down the sides of the filter housing 824 where it is then flushed through pipe 884 where it is later distilled.

When the operator is satisfied that this first phase of filter cleansing is completed, valve 816 may be released and now valve 816' can be selectively activated for another predetermined time period. Thirty seconds may be sufficient for this second phase of the backwash cycle. By activating valve 816', the vanes 834 of the liquid motor pump 812 begin rotating in a counterclockwise direction, which in turn, causes the connected nozzle shaft 878 to turn accordingly. Fluid now flows in the direction of arrow 896'. This causes additional cleansing that may not have been otherwise performed during the first or clockwise backwashing phase. It will be appreciated that the present system could be simplified by eliminating the clockwise or the counterclockwise mode of backwashing. By doing such the valves 816 could be eliminated. However, it is believed that by utilizing both phases, the filter cartridge assembly 826 is returned to its near pristine state in a shorter time period. Thus, this means the dry cleaning machine is down for a shorter time period.

Once the suspended contaminants and filter bed particles 874 have been removed from the mesh 862, the backwashing cycle is complete and the motor 802 can be terminated, valve 888 can be opened, and the normal mode of filtering solvent during the dry cleaning process may resume. At this time, a bed of filter material needs to be reestablished on the mesh 862. This is accomplished by adding appropriate amounts of diatomaceous earth and activated carbon to the sump 416. After a few seconds of operation of the main pump 402, these two substances deposit themselves in a bed upon the mesh 862 in each filter assembly 814. It will be appreciated that a 60 micron mesh 862 should be used. This allows the diatomaceous earth to be collected on the mesh 862 while the activated carbon particles, which are much finer, will be caught by the layer of diatomaceous earth that forms on the mesh 862. It will be appreciated that one or more filter assemblies 814 can be used in series or parallel depending upon the desired result.

FIGS. 20–22 illustrate a preferred permanent filter cleaning system 900 that also employs a backwashable mode of operation. Where possible, like numbers will be used to identify identical components. It will be appreciated that filter cleaning system 900 can be used in numerous applications including where industrial solvents need to be recycled, i.e., cleansed or purified to a certain acceptable level. System 900 can also be used where an oil component needs to be separated from a contaminated liquid/solution. However, for discussion purposes only, the following discussion is presented in the context of a filter system that can be used in a dry cleaning operation where perchloroethylene is the solvent that is being recycled.

Referring to FIG. 20, the primary components of a solvent cleaning system 900 are illustrated. The system 900 is comprised of a fluid filter assembly 902, a reservoir 904 of filtered solvent, a supply tank 906 of contaminated liquids/solvents that need to be filtered, recycled, or the like, a pressure pump 908 that is powered by a motor 910, and an auxiliary drain tank 912 for housing impurities that are accumulated during the filtering process. A distillation system 40 may be used in lieu of tank 912. The system 900 also includes a set of two-way flow-control valves 914 and 916 and one-way flow control valves 918 and 918' for controlling the flow of fluids throughout the system 900. It will be appreciated that said valves may be mechanically operated or electronically operated. The system 900 further includes a pressure gauge 920 located in outlet fluid conduit 922 which is in turn connected to an inlet of reservoir 904. An outlet of reservoir 904 is connected by conduit 924 to flow control valve 914. A second pressure gauge 926 is provided in supply line 928 for monitoring the inlet pressure of the fluid supply. A fluid flow meter 930 may be provided in outlet conduit 922 for visually displaying to the operator the fluid flow rate of system 900. A feeder line 932 connects the flow control valve 916 to the inlet port of the filter assembly 902 while a drain tank supply line 934 connects the outlet of the filter assembly 902 to the drain tank 912.

It will be appreciated that the supply tank 906 is a source of contaminated liquid/solvent that needs to be processed so its major components can be reutilized in manufacturing or commercial processes.

The fluid pump 908 preferably is capable of handling 60 gallons per minute at a pressure of 65 PSI. The pump 908 may be driven by an electric motor 910 or by other means depending upon the desired results and circumstances. By uniquely arranging the pump 908 in the fluid circuit as illustrated in FIG. 20, a single pump 908 can be utilized during a first mode of operation called the filtering mode 936 (identified by the open arrows) as well as a second mode of operation called the backwashing mode 938 (identified by the shaded in arrows). The backwashing mode 938 is used when the flow rate during the filtering mode of operation 936 has dropped to a predetermined value, for example, 50 gallons per minute. The backwashing mode of operation 938 is unique in that it can return the filter assembly 902 to a near pristine state in just a few minutes of down time.

Referring now to FIGS. 21 and 22, a permanent filter assembly 902 is more clearly illustrated. The permanent filter assembly 902 includes an electric motor 940, a head section 942, a nozzle assembly 944, a cover assembly 946, a filter cartridge assembly 948 and a bell-shaped housing 950. The housing 950 is substantially similar to housing 824 of the FIG. 16 embodiment. The electric motor 940 is a conventional 110 volt motor that is operable to preferably operate between 8–12 revolutions per minute. A three position directional control toggle switch 941 allows the operator to manually switch directions of the output shaft 952. The motor's output shaft 952 mates with a notch in a flexible coupling 954. The flexible coupling 954 is also notched to receive a corresponding insert or plug 956 that is fixed to one end of a nozzle shaft 974.

The head section 942 includes a cylindrical member 958 that has a sealed inner bore 960 and an inlet passage 962 for receiving a fresh supply of fluid for the backwashing mode of operation 938. It will be appreciated that cleaned solvent from reservoir 904 can be used during the backwashing cycle. Also, it is understood that an alternative source of backwashing fluid, for example water, could be introduced by a conduit 964 which would be connected to inlet passageway 962 instead of supply line 932. If this latter concept was employed, the pump 908 would not be required. The head section 942 further includes a first retaining block 966 and a second retaining block 968 that are fixed, preferably by weld, to an inner surface of the cylindrical member 958. Appropriate elastomeric seals 970 and bearings 972 are provided for assisting and guiding the nozzle assembly 944 and for preventing leakage between various passageways.

The nozzle assembly 944 includes a centrally located elongated pipe structure 974 preferably made of metal, the upper insert or plug 956 that is permanently fixed to the pipe structure 974, a plurality of radially spaced fluid nozzles 976 and an end cap 978. The pipe structure 974 has at its one end a window 980 that receives pressurized backwashing fluid from inlet passageway 962 as indicated by the arrow 982.

The filter cover assembly 946 is preferably a substantially cylindrical member 984 that has a centrally positioned bore for receiving and being welded to the cylindrical member of the head section 942. The cover member 984 is unique in that it also has an outlet passageway 986 that is connected to outlet conduit 922. The bore is preferably 1 to 2 inches in diameter and allows for non-restricted fluid outlet flow to reservoir 94. The cover member 984 is connected by conventional fasteners to the housing 950 and appropriate elastomeric seals 988 are used to prevent leakage between these members.

The filter cartridge assembly 948 has a simpler construction than that of cartridge assembly 826 (FIG. 17). Filter cartridge assembly 948 includes a unique design comprised of a first upper plate 990, a second lower plate 992, which are connected by an inner sheet of fence-like rolled material 994, a central section of mesh material 996 that is preferably made of 60 micron configuration, and an outer section of rolled material 998. The inner rolled material 994 and the outer rolled material 998 are preferably made of one half inch sections defining horizontal and vertical members and add structural integrity to the filter cartridge assembly by providing a rigid surface for securing the filter mesh material 996. Preferably resistance welding is used to secure the inner rolled material 994, the mesh 996 and the outer rolled material 998 at distal ends to the upper plate 990 and to the lower plate 992. A plurality of angle brackets 1000 are welded to the inside surface of the inner rolled material 994 as well as to the lower plate 992 and the upper plate 990. Together these features provide a structurally rigid filter cartridge assembly 948 that is secured at its upper plate 990 by conventional fasteners to the flanges of the housing 950 and the cover member 984.

Referring to FIG. 22, the depth(d) of each pleat 1002 is preferably between one quarter of an inch to one half of an inch. The present design provides for a filter cartridge assembly 948 that has approximately 12-15 square feet of filtering area. It will be appreciated that said area can be modified by merely changing the overall height and/or diameter of the cartridge assembly 948 and by changing the depth(d) of each pleat 1002.

The method of operating the filtering system 900 will now be presented. With reference to FIGS. 20 and 21, the normal filtering mode of operation 936 (as indicated by the hollow arrows) will be discussed first. In this regular mode of operation, a supply 906 of contaminated solvent or other fluid materials will be properly connected to supply line 928 which contains the pump 908 and flow control valves 914 and 916. Pump 908 can now be energized which causes contaminated fluid to flow in the direction of arrow 1004. This fluid first passes over the outer material 998, through the bed of diatomaceous earth 1006 that is on the outside surface of the mesh 996, then through inner structural material 994. The cleansed fluid is under pressure as it is directed in the direction of arrow 1008 to outlet passageway 986 where it is then delivered to reservoir 904. During the filtering mode of operation 936, two way valve 914 blocks fluid flow from conduit 924. Likewise, two-wave valve 916 prevents fluid flow to conduit 932.

The filtering mode of operation 936 will continue until a predetermined event occurs such as the supply 906 is depleted, or when the filter cartridge assembly 948 becomes sufficiently constricted that it needs backwashed. The operator can monitor sight pressure gauges 926 and 920 in order to ascertain when such an event occurs. Furthermore, fluid flow meter 930 will also tell the operator when an insufficient flow rate is occurring such that a backwashing of the filter cartridge assembly 948 is necessitated. For example, if the fluid flow rate during the filtering mode of operation 936 drops to below adequate gallons per minute, then the operator may consider initiating a backwashing mode of operation 938.

The backwashing mode of operation requires the operator to flip switch 941 in order to energize motor 940 in either a forward or reverse mode of operation. It is suggested that one direction be initiated for approximately 30 seconds before switching the motor 940 to the second direction of operation, which also takes preferably approximately 30 seconds. Once the motor 940 is energized, the two-way valve 914 needs to be thrown to its second position such that fluid no longer enters it from supply 906. Likewise, two-way valve 916 is thrown to its second position such that fluid is free to enter feeder line 932. Thus, clean fluid is drawn from reservoir 904 through 924, through valve 914, pressurized by pump 908, directed through valve 916 to feeder line 932 where the pressurized fluid enters inlet passageway 962. Fluid passes from the inlet passageway 962 to inlet window 980 of the pipe structure 974 where the pressurized fluid is relieved through the plurality of nozzles 976. As illustrated in FIGS. 21 and 22, a plurality of sheet-like overlapping sprays 964 are generated by the nozzles 976. As the motor 940 rotates the pipe structure 974 at approximately 10 RPM, every square inch of mesh 996 is blasted with high pressure spray, repeatedly. The operator may selectively change the direction of the motor 940 by flipping toggle switch 941. This action causes the diatomaceous earth 1006 and the contaminated particles 1010 that have built up upon the bed of diatomaceous earth 1006 to be blasted off the outer surface of the mesh 996 where they then fall down along the inside surface of the housing 950 and are flushed out of the housing 950 in the direction of arrow 1012. Because valve 918 is open, the flushed out materials 1006 and 1010 are free to travel to a drain tank 912 or still 40.

Once the backwashing mode of operation 938 has been completed, the filtering mode of operation 936 can resume. It is preferred that a new layer of diatomaceous earth 1006 and activated carbon 1010 be reapplied to the outside surface of the mesh 996 before filtering begins. This assures that a proper filtering bed is located on the 60 micron mesh 996.

Figure 23:
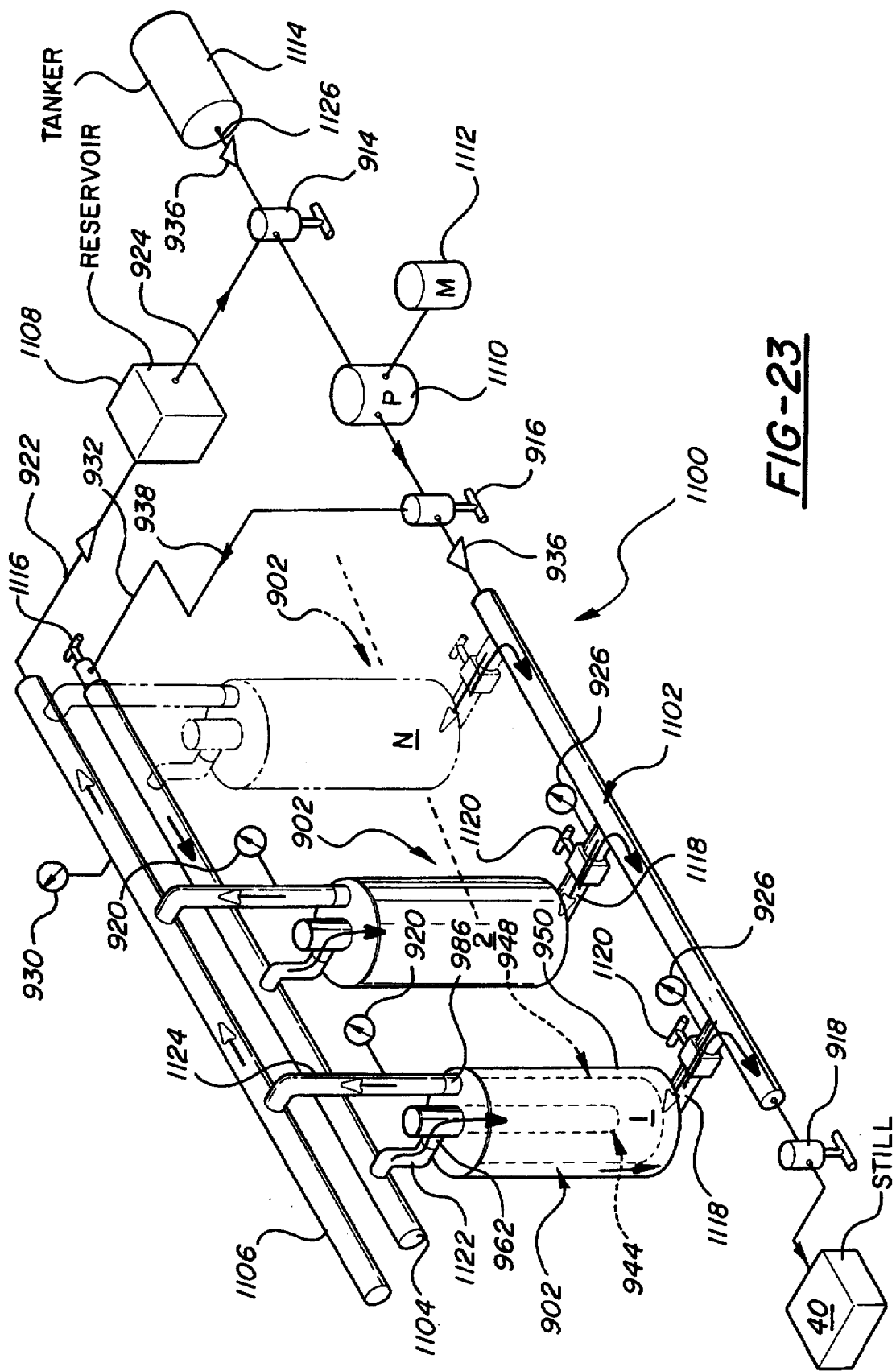
FIG. 23 is a schematic diagram of a fluid processing center employing a plurality of backwashable filter assemblies that are illustrated in FIG. 21.

Referring now to FIG. 23, an alterative embodiment fluid processing center 1100 is illustrated and represents schematically one possible way of connecting in parallel a plurality of permanent filter assemblies 902 for processing/ recycling large volumes of materials. Specifically, it is contemplated that such a system 1100 can be designed to include an infinite(N) number of filter assemblies 902. For example, if a conventional 40,000 gallon tanker becomes the supply source, then approximately 12 filter assemblies 902 would be located in parallel to create a bank of filters. Under the present design, each filter assembly 902 would be capable of processing approximately 3600 gallons of solvent or the like per hour. A first and second filter assembly 902 has been illustrated in some detail while the Nth filter assembly 902 is represented in phantom.

The fluid processing center 1100 is comprised of a plurality of filter assemblies 902, a header or supply manifold 1102, a backwash manifold 1104, a return manifold 1106, a reservoir 1108 of filtered material such as perchloroethylene, a large capacity pump 1110 and motor 1112, a supply source such as a tanker 1114, a drain tank 912 or still 40, two-way control valves 914 and 916, a one-way control valve 918 and an additional two-way control valve 1116. Various connectors are used to selectively connect the filter assemblies 902 to the manifold's 1102, 1104 and 1106. For example, connector 1118 functions similar to the tube 884 (FIG. 21) in that it connects the filter assembly 902 to the main supply manifold 1102. The connector 1118 includes a one-way control valve 1120 and a pressure gauge 926. The connector 1118 and valve 1120 are designed such to allow the filter assembly 902 to be easily disconnected from the fluid processing center 1100. This may be required in the event the filter assembly 902 needs to be replaced or the capacity of the processing center 1100 needs to be varied.

A second connector 1122 connects the backwash manifold 1104 to the inlet passageway 962 of the filter assembly 902. The second connector 1122 can be of the flexible type and is capable of quickly disconnecting the filter assembly 902 from the backwash manifold 1104.

A third connector 1124 connects the outlet port 986 to the return manifold 1106. The third connector 1124 may be of the flexible type and employs quick-disconnect couplings that allow the filter assembly 902 to be promptly disconnected from the return manifold 1106. Thus, the filter assembly 902 can be either permanently or temporarily affixed to the manifolds thus allowing the fluid processing center 1100 to be tailor fit for a particular situation. A pressure gauge 920 is located within the third connector 1124 for providing the operator with an outlet pressure reading. Other pressure gauges or fluid flow rate gauges 930 may be located in various portions of the fluid processing center 1100 for providing an operator with a visual indicator of the current flow rate.

The manifolds 1102, 1104 and 1106 may be made of PVC, steel or whatever material is proper for the situation, and must be of sufficient diameter in order to continuously feed or carry away the fluids to and from the filter assembly 902. It is contemplated that 4"–8" diameter pipes could be used as the manifolds in order to handle the capacity of the tanker 1114 which generally has an outlet pipe of approximately 4" in diameter. Likewise, the various connectors 1118, 1122 and 1124 must be of sufficient diameter in order to not starve the filter assemblies 902.

Referring now to FIG. 23, the method of operating the fluid processing center 1100 will now be discussed. First, the operator must properly connect the supply source or tanker 1114 to the inlet line 1126. The inlet line 1126 includes the two-way control valves 914, 916 as well as the high volume pump 1110 and its associated motor 1112. It will be appreciated that the pump 1110 must be of sufficient capacity to deliver an un-interrupted supply of fluid from the tanker 1114 to and throughout the rest of the fluid processing center 1100. For example, if 12 filter assemblies 902 are connected in parallel then the pump 1110 should have a flow rate of approximately 40.000 gallons per hour at 65 PSI.

The normal filtering mode of operation 936 is indicated by the hollow arrows throughout FIG. 23 while the backwashing mode of operation 938 is represented by the solid arrows. During the normal mode of operation 936, fluid that needs to be filtered/recycled passes through conduit 1126, is pressurized by pump 1110, where it is then delivered to main supply manifold 1102 and enters the plurality of first connectors 1118. At this point valve 918 is closed while the plurality of one-way valves 1120 remain open. This allows the fluid to be filtered by the filter cartridge assembly 948 as previously discussed in FIG. 21. The cleansed solvent then exits the filter housing 950 through passageway 986, through connector 1124 and to the return manifold 1106. The filtered fluid then travels through the return manifold 1106, through conduit 922 where it accumulates within a large reservoir 1108. It will be appreciated that the large reservoir 1108 must be of sufficient capacity to handle the fluids from tanker 1114. In the alternative, an additional tanker 1114 could be used in lieu of the reservoir 1108 in order to facilitate the handling of the filter solvent. The filtering mode of operation 926 continues as long as necessary and during such operation the operator can visually monitor the pressure gauges 920 and 926 as well as the fluid flow gauge 930 in order to continuously monitor the performance of the fluid processing center 1100.

If during the filtering mode of operation 926 the operator determines that a particular filter assembly 902 needs to be cleaned, then the operator merely switches to the backwashing mode of operation 938. This is accomplished by redirecting the flow of fluid within the circuit of the fluid processing center 1100 by switching valve 914 such that fluid is now received only from conduit 924, pressurizing the filtered fluid from reservoir 1108, throwing two-way valve 916 to its second position thus routing pressurized fluid through feeder line 932 where the fluid is delivered to the backwash manifold 1104. From there the fluid enters the plurality of second connectors 1122 in order to supply a sufficient quantity of clean backwash fluid to the nozzle assemblies 944. Each motor 940 is energized at this point thus causing the nozzle assemblies 944 to rotate thus delivering a plurality of rotating high pressurized streams or sheets of liquid to be delivered to the inside surface of each filter cartridge assembly 940. The materials that are blasted off of the filter cartridge assemblies 948 are passed through the connectors 1118 where it is then transported out of the main supply manifold 1102 towards valve 918 and into a drain or still 40. If a commercial solvent of significant value is being used during the backwash cycle, it would be beneficial to distill that solvent in a distillation system 40 in order to recover the perchloroethylene, or other solvent, for later reuse. This aspect of the invention is fully described previously in FIGS. 1–15.

The operator can continue the first phase of backwashing, that is rotating the motor 940 and the nozzle assembly 944 in a first or clockwise direction for approximately 30 seconds. The second phase of the backwashing mode of operation is accomplished by the operator reversing the motor to cause counterclockwise direction of the rotating spray nozzle assembly 944 for approximately an additional 30 seconds. Thus the operator can selectively rotate the nozzle assemblies 944 to cause cleansing of the filter cartridge assembly 948 in a number of desirable fashions. Once backwashing is complete, the operator can resume the filtering mode of operation 926 by the procedures previously stated herein. It is contemplated that the operator may wish to apply a new bed of filter material to the mesh 996 of the filter cartridge assembly 948 as previously discussed herein.

Figure 24:
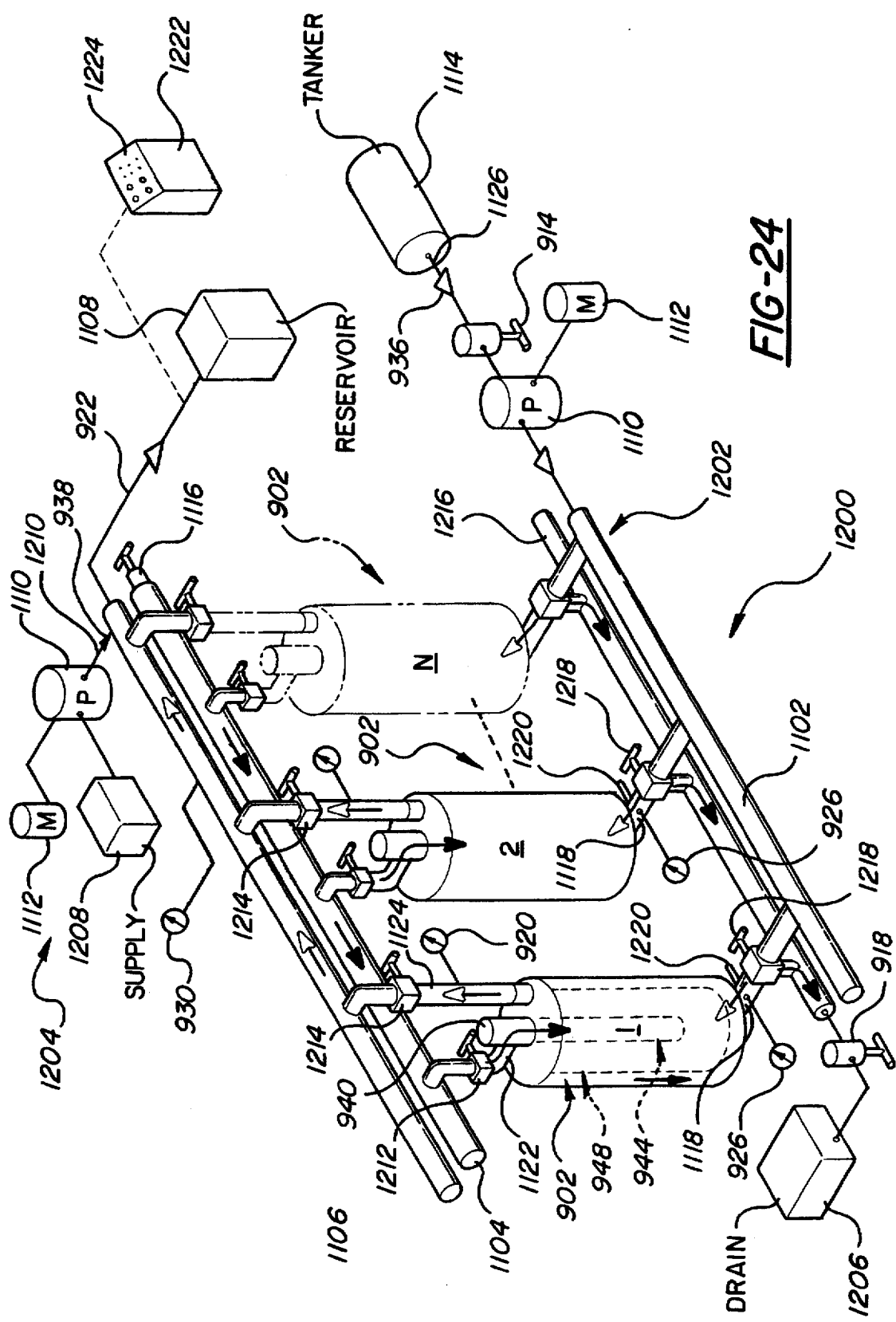
FIG. 24 is a schematic diagram of an alternative fluid processing center, illustrating a backwash fluid circuit that is separate from the normal filtering circuit.

FIG. 24 illustrates an alternative fluid processing center 1200 which offers flexibility over the fluid processing center 1100 of FIG. 23. The fluid processing center 1200 is unique in that it has a first fluid filtering circuit 1202 and a second or backwashing fluid circuit 1204. The advantage of having two separate circuits is that a less expensive backwash medium such as water can be used and flushed out to a drain or other suitable location without having to distill the backwash material. There are numerous economic advantages associated with such a design.

The primary components of the fluid processing center 1200 will now be discussed. Where possible, like reference numerals will be used. The fluid processing center 1200 is comprised of a supply source such as a tanker 1114, inlet connector lines 1126, a high volume fluid pump 1110 and a motor 1112, a main supply manifold 1102, a plurality of conduits or connector lines 1118, a plurality of permanent filter assemblies 902, a backwash manifold 1104, a return manifold 1106, a plurality of connectors 1122 and 1124, a reservoir 1108 of filtered fluid, a one-way control valve 918 and a drain 1206. The drain 1206 must be of sufficient capacity to hold all of the backwash media that is accumulated during one or more backwash cycles.

The components added to the fluid processing center 1200 include a separate backwash fluid supply source 1208, for example, water that is connected by conduit 1210 to pump 1110 and control valve 1116, which is located at one end of the backwash manifold 1104. Furthermore, one-way control valves 1212 and 1214 are located within connectors 1122 and 1124, respectively. These valves allow the operator to selectively backwash a particular filter assembly 902 while the remaining filters continue in their normal filtering mode 926 of operation. This is one of the unique advantages of the dual fluid circuit design that is illustrated in FIG. 24. The fluid processing center 1200 also includes a separate backwash fluid return manifold 1216 that is connected to two-way control valves 1218. The backwash fluid return manifold 1216 is in turn connected by conduits to the drain 1206.

The fluid processing center 1100 and 1200 can be automated by employing circuit logic that allows for the proper sequencing of the valves. For example, in fluid processing center 1200, a control panel 1222 may be connected and in communication with the fluid processing center 1200 for providing the operator with a central station for operating the center 1200. Such a control panel 1222 would be operable to selectively manipulate the various valves in the fluid filtering circuit 1202, the various valves in the backwash circuit 1204, the motors 940 and monitor the gauges 920, 926 and 930. This is accomplished by hard wiring (not shown) the various valves, gauges, and motors to the control panel 1222 in order to provide either digital or analog read outs for the operator. Switches or buttons 1224 are on the panel 1222 for allowing the operator to control the fluid processing center 1200. Thus, if during the normal filtering mode of operation 936 the operator ascertains that a particular filter assembly 902 is not performing satisfactorily, then the appropriate valves 1212, 1214 and 1218 may be sequenced in order to integrate out that particular filter assembly from the fluid processing center 1200. This may include removing the filter assembly 902 entirely from the processing center 1200 or merely backwashing that particular filter. If backwashing is desired, the operator merely needs to selectively activate certain buttons 1224 that are on the control panel 1222 thus making the fluid processing center more user friendly.

With reference to FIG. 24, the method of operating the fluid processing center 1200 will now be discussed. The usual mode of operation will be the employment of the fluid filtering circuit 1202 and the flow of fluid during this circuit is indicated by the hollow arrows 936. Here the tanker 1114 is appropriately connected to inlet line 1126 where the incoming fluid is then pressurized by pump 1110 and subsequently delivered to the main supply manifold 1102. The two-way control valve 1218 is located in a first position which allows fluid flow from main supply manifold 1102 to and through the first connector 1118. Thereafter the contaminated fluid is filtered within each filter assembly 902 in the same manner as discussed previously herein. Because one-way control valve 1214 is open, the pressurized newly filtered fluid is directed to return manifold 1106, through conduit 922 where it accumulates within reservoir 1108. This filtering mode 926 continues until the operator terminates such mode which could be when the tanker 1114 is emptied.

One of the unique advantages of the fluid processing center 1200 is that it allows for continued filtering and processing of large volumes of fluid while a particular filter assembly 902 can be taken out of the circuit 1202 and backwashed without interrupting the overall filtering process. One or more filter assemblies 902 could be backwashed while the remaining bank of filter assemblies 902 would continue their filtering mode of operation. For example, lets say filter number one in the bank of filter assemblies 902 needs to be backwashed because its performance has deteriorated to a predetermined level. If this occurs, then the operator merely needs to close valve 1214, throw valve 1218 to its second position thus opening a fluid path to the backwashed fluid return manifold 1216, open valve 918 and 1212. At this point fluid no longer flows from the tank 1114 to filter number one. Pump 1110 may now be activated along with the electric motor 940 which drives the nozzle assembly 944. If water is the source 1208, then high pressurized water is now delivered to backwash manifold 1104 and is only delivered to filter number one because of valve 1212 being opened. As the pressurized water enters the nozzle assembly 944, sheets of high pressurized water are blasted upon the wire surface of the filter cartridge assembly 948 thus causing the collected impurities to be flushed out through valve 1218 and into the backwash fluid return manifold 1216 and drain 1206. The operator can reverse the rotation of the motor 940 by conventional means thus causing the nozzle assembly 944 to reverse its direction and to return the filter cartridge assembly 948 to a pristine state. Because the backwashing mode of operation takes only approximately one minute, filter number one is only out of the fluid filtering circuit 1202 for a very short time. To return filter number one back into the filtering mode of operation, the operator merely needs to deactivate pump 1110, close valve 1212, let the filter assembly 902 drain, then throw valve 1218 to its first position and then reopen valve 1214. At this time the proper filter bed of material such as diatomaceous earth 1006 and activated carbon 1010 can be added to a sump 1220 that is connected to connector line 1118. Once the filter bed has been reestablished, which happens very quickly, the normal filtering mode 926 of operation can resume.

It will be appreciated that if more than one filter assembly 902 is to be backwashed, then the same method of operation as set out above should be implemented. Thus it is contemplated that a fluid processing center 1200 can run continuously without any down time except for when the supply source 1114 is depleted.

After studying the drawings and foregoing description, various modifications, alterations and additions to the preferred embodiments discussed above, beyond those variations already mentioned, will be readily apparent to persons skilled in the art. Accordingly, it is to be understood that the present invention is not limited to the specific embodiments and methods described above, but should be deemed to extend to the subject matter defined by the appended claims, including all fair equivalents thereof.

I claim:

1. A fluid filter assembly comprising:
    a head section having a central passageway and an outlet port;
    a drive member connected to the head section;
    a filter cover connected to the head section;
    an elongated filter housing connected to the filter cover;
    an elongated filter cartridge located within the filter housing, the cartridge including an inner surface and an outer surface for collecting particles thereon; and
    an axially extending fluid delivery member fixed at one end to the drive member, the fluid delivery member extending through the head section and into the filter housing, whereby the fluid delivery member rotates at a velocity in proportion to the velocity of the drive member.

2. The fluid filter assembly as claimed in claim 1, wherein the fluid delivery member includes a plurality of radially positioned spray nozzles which direct pressurized fluid onto the inner surface of the filter cartridge.

3. The fluid filter assembly as claimed in claim 1, further comprising a guide structure connected to the head section for maintaining the fluid delivery member in a central position relative to the filter cartridge.

4. The fluid filter assembly as claimed in claim 1, wherein the drive member is an electric motor that is coupled to the fluid delivery member.

5. The fluid filter assembly as claimed in claim 1, wherein the fluid delivery member includes an inlet window for supplying pressurized fluid to a central shaft portion of the fluid delivery member.

6. The fluid filter assembly as claimed in claim 1, wherein the filter cartridge includes an upper plate and a spaced-apart lower plate, a screen positioned between the plates and defining the inner surface of the filter cartridge, and a mesh located adjacent the screen and defining the outer surface of the filter cartridge.

7. The fluid filter assembly as claimed in claim 6, wherein the filter cartridge further includes structural support rods extending between the upper plate and the lower plate.

8. The fluid filter assembly as claimed in claim 1, wherein the filter cover includes an outlet passageway for removing the filtered fluid from the filter housing.

9. The fluid filter assembly as claimed in claim 1, wherein the drive member is a fluid pump, said fluid filter assembly further comprising a fluid flow control system for controlling the rotation of the fluid pump.

10. A backwashable filter cleaning system for a liquid operated device, the filter system comprising:

a motor connected to a pump for producing a supply of pressurized liquid to a spray nozzle assembly;

a filter housing being operable to be backwashed;

a drive means that is connected to a spray nozzle assembly;

an elongated spray nozzle assembly extending within the housing and operable to receive the pressurized liquid; and a permanent filter extending within the housing and operable to receive the spray nozzle assembly.

11. The filter cleaning system as claimed in claim 10, wherein the spray nozzle assembly includes a nozzle shaft that is secured at its upper end to the drive means, and at its other end, the nozzle shaft is supported by a self-centering member, the spray nozzle assembly further includes a plurality of spray nozzles that are selectively positioned to cause the permanent filter to be cleansed to a pristine state.

12. The filter cleaning system as claimed in claim 10, wherein the permanent filter includes:

an upper plate that is longitudinally offset from a lower base plate;

a cylindrically-shaped metal screen located between the upper member and the lower base plate;

a mesh positioned between the screen and the filter housing, the mesh being operable to collect sediment;

a plurality of bands for compressing and securing the mesh against the screen; and a plurality of longitudinally extending rods connected to the upper plate and the lower plate.

13. The filter cleaning system as claimed in claim 10 further comprising a fluid flow control system in fluid communication with the pump for controlling the pressurized liquid.

14. The filter cleaning system as claimed in claim 13, wherein the fluid flow control system includes a set of solenoid valves, the control system being operable to vary the rotational velocity of the spray nozzle assembly.

15. The filter cleaning system as claimed in claim 10, wherein said pump pumps liquid during a filtering mode of operation and pumps liquid within the system during a backwashing mode of operation.

16. The filter cleaning system as claimed in claim 10, wherein the drive means is reversible.

17. The filter cleaning system as claimed in claim 16, further comprising a fluid control system in fluid communication with the pump for controlling the pressurized liquid.

18. The filter cleaning system of claim 17, wherein the fluid flow control system includes a set of solenoid valves that may be sequenced to cause forward or reverse rotation of the reversible drive means, the control system being operable to vary the rotational velocity of the spray nozzle assembly.

19. The filter cleaning assembly as claimed in 16, wherein the spray nozzle assembly includes a nozzle shaft that is secured at its upper end to the reversible drive means, and at its other end, the nozzle shaft is supported by a self-centering member, the spray nozzle assembly further includes a plurality of spray nozzles that are selectively positioned to cause the permanent filter to be cleansed to a pristine state.

* * * * *